US011568480B2

(12) United States Patent
Bjonerud et al.

(10) Patent No.: US 11,568,480 B2
(45) Date of Patent: Jan. 31, 2023

(54) ARTIFICIAL INTELLIGENCE DERIVED ANONYMOUS MARKETPLACE

(71) Applicant: Cerebro Capital, Inc., Baltimore, MD (US)

(72) Inventors: Matthew C. Bjonerud, Baltimore, MD (US); Kevin Dieter, Herndon, VA (US)

(73) Assignee: CEREBRO CAPITAL, INC., Baltimore, MD (US)

( * ) Notice: Subject to any disclaimer, the term of this patent is extended or adjusted under 35 U.S.C. 154(b) by 0 days.

(21) Appl. No.: 16/149,259

(22) Filed: Oct. 2, 2018

(65) Prior Publication Data

US 2019/0102835 A1 Apr. 4, 2019

Related U.S. Application Data

(60) Provisional application No. 62/567,293, filed on Oct. 3, 2017.

(51) Int. Cl.
*G06Q 40/02* (2012.01)
*G06N 20/00* (2019.01)
*H04L 65/403* (2022.01)

(52) U.S. Cl.
CPC ........... *G06Q 40/025* (2013.01); *G06N 20/00* (2019.01); *H04L 65/403* (2013.01)

(58) Field of Classification Search
CPC ...... G06Q 40/025; G06Q 40/02; G06Q 40/00; G06Q 40/06; G06Q 30/0601; G06Q 30/0275; G06Q 30/0255; G06Q 30/0269; G06Q 30/08; G06Q 30/00; G06Q 30/0283; G06Q 30/06; G06Q 20/24; G06Q 99/00; H04L 51/32; H04L 65/403; H04W 72/04; H04W 84/18; G06F 16/24578; G06F 16/9535; G06F 3/0482; G06N 20/00; G06N 7/005
See application file for complete search history.

(56) References Cited

U.S. PATENT DOCUMENTS 5,940,812 A * 8/1999 Tengel .................. G06Q 40/04 705/38
2004/0236675 A1* 11/2004 Lynch .................. G06Q 40/025 705/38

(Continued)

*Primary Examiner* — Joseph W. King
*Assistant Examiner* — Divesh Patel
(74) *Attorney, Agent, or Firm* — Miles & Stockbridge P.C.

(57) ABSTRACT

Systems and methods for an autonomous marketplace system include a server that extracts borrower data including financial, operational and business data, and lender data from prospective lenders including financial data and a target profile for each prospective lender. It then generates, using artificial intelligence, an autonomous ranked match of prospective lenders. The artificial intelligence identifies relationships between the borrower data and the prospective lender data to generate the autonomous ranked match based on a preference of the borrower and a correlation between the identified relationships. Upon the borrower entering an internet based chat room, the identities of the prospective lenders are revealed. The borrower selects one or more prospective lenders to receive a finance request, and after selection by the borrower, the selected prospective lenders are first notified and informed of an existence of the finance request of the borrower.

20 Claims, 25 Drawing Sheets

400

STEP 3

Inputs

Outputs

Comparable Borrower Deal Data

405

Risk Parameters of Network Lenders

410

Recent deal closing data from lenders

415

Artificial Intelligence

Rules and behaviors for handling Data

430

Identified Likely Lenders

440

(56) References Cited

U.S. PATENT DOCUMENTS

| | | | | |
|---|---|---|---|---|
| 2006/0085325 | A1* | 4/2006 | Jammal | G06Q 40/08 705/38 |
| 2007/0027791 | A1* | 2/2007 | Young | G06Q 40/025 705/37 |
| 2010/0131311 | A1* | 5/2010 | Parker | G06Q 10/06393 705/7.39 |
| 2013/0124394 | A1* | 5/2013 | Takamatsu | G06Q 40/02 705/38 |
| 2016/0247223 | A1* | 8/2016 | Arnall | G06Q 40/025 |
| 2016/0267583 | A1* | 9/2016 | Fei | G06Q 40/025 |
| 2017/0169508 | A1* | 6/2017 | Song | G06Q 20/223 |
| 2018/0240187 | A1* | 8/2018 | Lee | G06Q 40/025 |

* cited by examiner

CREDIT EXPLORER

Enter details to launch a credit explorer

Facility Type
Purpose
Desired Term
Desired Amortization
Requested Amount
Revolving Amount
Term Amount
New Loan
Refinancing
Target Funding Date

1310

Preferences

| | Very Important | Important | Neutral | Not Important | Marginal |
|---|---|---|---|---|---|
| Pricing | | | | | |
| Covenant Levels | | | | | |
| Maturity | | | | | |
| Amortization | | | | | |
| Debt Amount | | | | | |
| Bank Experience in Your Industry | | | | | |
| Bank with Local Presence | | | | | |
| Bank Experience with Similar Transactions | | | | | |

1320

Request Description

Target Proposal Due Date

Close

Credit Explorer 1410 1420

Figure 14:
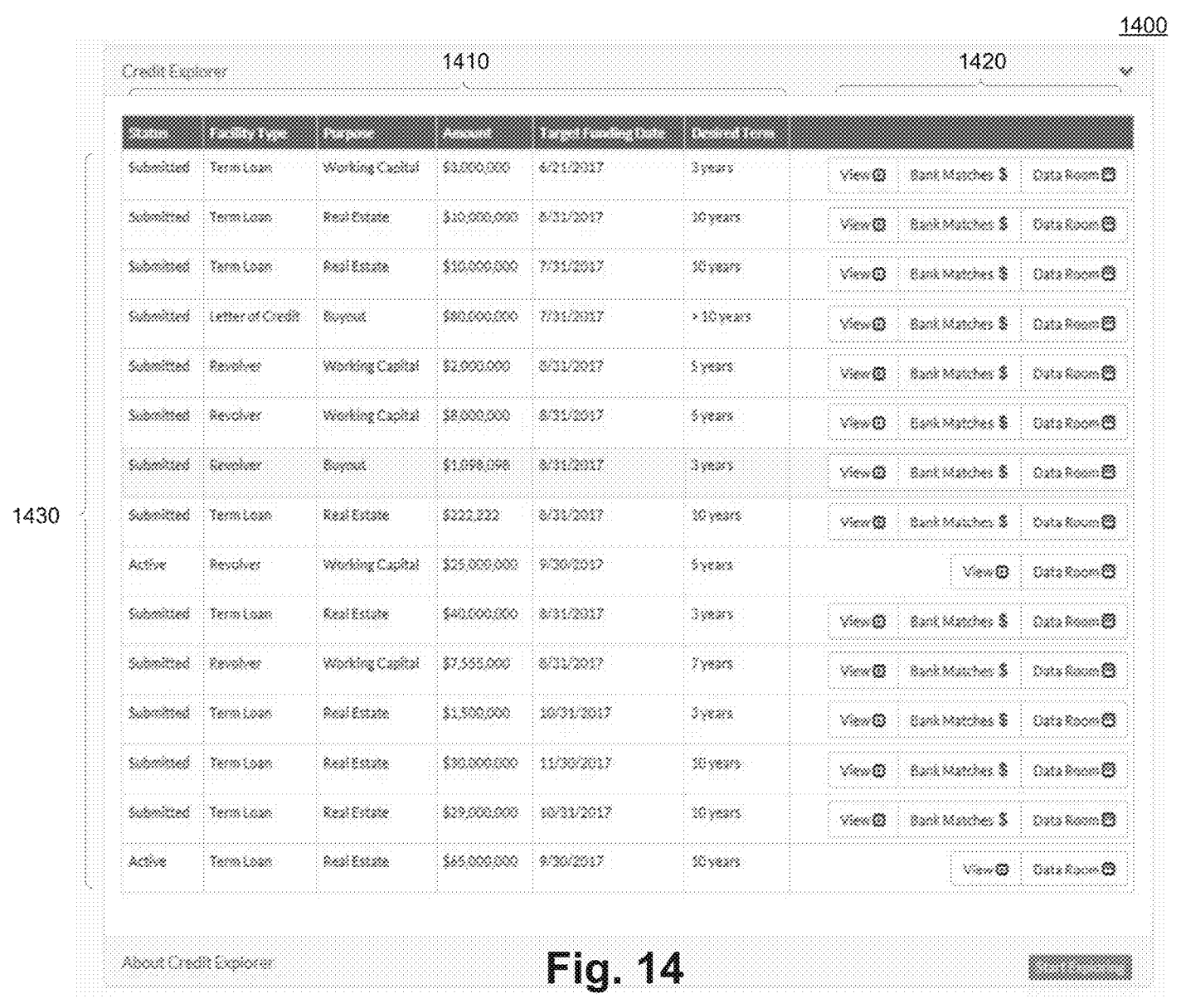

1430

| Status | Facility Type | Purpose | Amount | Target Funding Date | Desired Term | |
|---|---|---|---|---|---|---|
| Submitted | Term Loan | Working Capital | $3,000,000 | 6/21/2017 | 3 years | View · Bank Matches $ · Data Room |
| Submitted | Term Loan | Real Estate | $10,000,000 | 8/31/2017 | 10 years | View · Bank Matches $ · Data Room |
| Submitted | Term Loan | Real Estate | $10,000,000 | 7/31/2017 | 10 years | View · Bank Matches $ · Data Room |
| Submitted | Letter of Credit | Buyout | $80,000,000 | 7/31/2017 | > 10 years | View · Bank Matches $ · Data Room |
| Submitted | Revolver | Working Capital | $2,000,000 | 8/31/2017 | 5 years | View · Bank Matches $ · Data Room |
| Submitted | Revolver | Working Capital | $8,000,000 | 8/31/2017 | 5 years | View · Bank Matches $ · Data Room |
| Submitted | Revolver | Buyout | $1,098,098 | 8/31/2017 | 3 years | View · Bank Matches $ · Data Room |
| Submitted | Term Loan | Real Estate | $222,222 | 8/31/2017 | 10 years | View · Bank Matches $ · Data Room |
| Active | Revolver | Working Capital | $25,000,000 | 9/30/2017 | 5 years | View · Data Room |
| Submitted | Term Loan | Real Estate | $40,000,000 | 8/31/2017 | 3 years | View · Bank Matches $ · Data Room |
| Submitted | Revolver | Working Capital | $7,555,000 | 8/31/2017 | 7 years | View · Bank Matches $ · Data Room |
| Submitted | Term Loan | Real Estate | $1,500,000 | 10/31/2017 | 3 years | View · Bank Matches $ · Data Room |
| Submitted | Term Loan | Real Estate | $30,000,000 | 11/30/2017 | 10 years | View · Bank Matches $ · Data Room |
| Submitted | Term Loan | Real Estate | $29,000,000 | 10/31/2017 | 10 years | View · Bank Matches $ · Data Room |
| Active | Term Loan | Real Estate | $65,000,000 | 9/30/2017 | 10 years | View · Data Room |

About Credit Explorer

CREDIT EXPLORER: BANK MATCH RESULTS

Figure 16A:
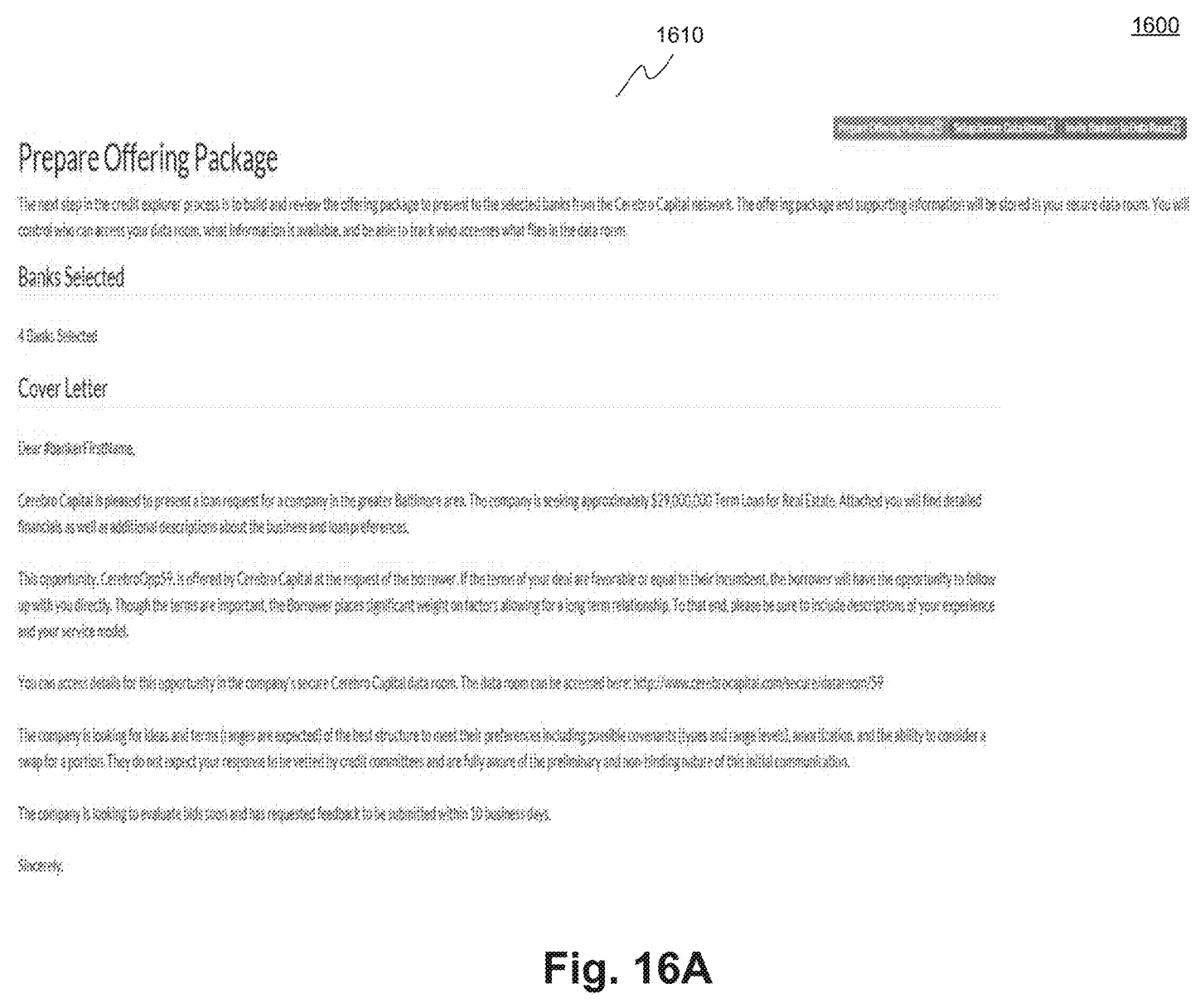

Prepare Offering Package

The next step in the credit explorer process is to build and review the offering package to present to the selected banks from the Cerebro Capital network. The offering package and supporting information will be stored in your secure data room. You will control who can access your data room, what information is available, and be able to track who accesses what files in the data room.

Banks Selected

4 Banks Selected

Cover Letter

Dear #BankerFirstName,

Cerebro Capital is pleased to present a loan request for a company in the greater Baltimore area. The company is seeking approximately $29,000,000 Term Loan for Real Estate. Attached you will find detailed financials as well as additional descriptions about the business and loan preferences.

This opportunity, CerebroOpp59, is offered by Cerebro Capital at the request of the borrower. If the terms of your deal are favorable or equal to their incumbent, the borrower will have the opportunity to follow up with you directly. Though the terms are important, the Borrower places significant weight on factors allowing for a long term relationship. To that end, please be sure to include descriptions of your experience and your service model.

You can access details for this opportunity in the company's secure Cerebro Capital data room. The data room can be accessed here: http://www.cerebrocapital.com/securedataroom/59

The company is looking for ideas and terms (ranges are expected) of the best structure to meet their preferences including possible covenants (types and range levels), amortization, and the ability to consider a swap for a portion. They do not expect your response to be vetted by credit committees and are fully aware of the preliminary and non-binding nature of this initial communication.

The company is looking to evaluate bids soon and has requested feedback to be submitted within 10 business days.

Sincerely,

Secure Data Room

Figure 21:
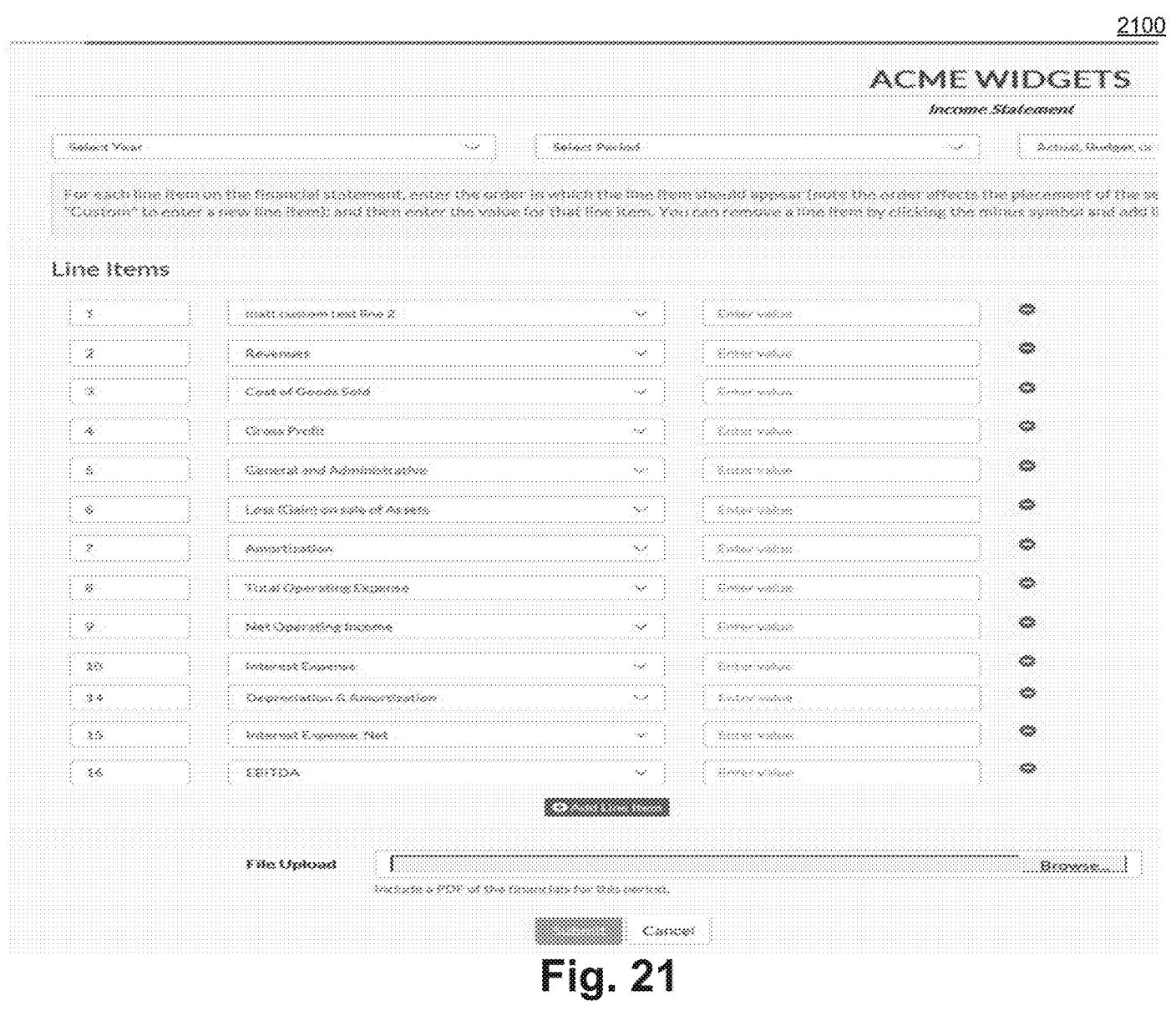

ACME WIDGETS

*Income Statement*

Select Year | Select Period | Actual, Budget, or

For each line item on the financial statement, enter the order in which the line item should appear (note the order affects the placement of the se... "Custom" to enter a new line item) and then enter the value for that line item. You can remove a line item by clicking the minus symbol and add ...

Line Items

| | | |
|---|---|---|
| 1 | matt custom test line 2 | Enter value |
| 2 | Revenues | Enter value |
| 3 | Cost of Goods Sold | Enter value |
| 4 | Gross Profit | Enter value |
| 5 | General and Administrative | Enter value |
| 6 | Loss (Gain) on sale of Assets | Enter value |
| 7 | Amortization | Enter value |
| 8 | Total Operating Expense | Enter value |
| 9 | Net Operating Income | Enter value |
| 10 | Interest Expense | Enter value |
| 14 | Depreciation & Amortization | Enter value |
| 15 | Interest Expense, Net | Enter value |
| 16 | EBITDA | Enter value |

File Upload Browse...

Include a PDF of the financials for this period.

Cancel

TERM SHEET INPUT MODULE

Lender may input custom language describing the term sheet, their level of commitment, and any necessary legal language

| | Lender types in terms | AI Indication provides real time feedback as the term is typed |
|---|---|---|
| Borrower | Lender types input | |
| Lender | Lender types input | |
| Facility Type | Lender types input | AI Provides Indicator (green, yellow, red) & basic commentary |
| Principal Amount | Lender types input | AI Provides Indicator (green, yellow, red) & basic commentary |
| Purpose | Lender types input | AI Provides Indicator (green, yellow, red) & basic commentary |
| Term | Lender types input | AI Provides Indicator (green, yellow, red) & basic commentary |
| Pricing | Lender types input | AI Provides Indicator (green, yellow, red) & basic commentary |
| Amortization | Lender types input | AI Provides Indicator (green, yellow, red) & basic commentary |
| Covenants | Lender types input | AI Provides Indicator (green, yellow, red) & basic commentary |
| Guaranty Requirement | Lender types input | AI Provides Indicator (green, yellow, red) & basic commentary |
| Collateral | Lender types input | AI Provides Indicator (green, yellow, red) & basic commentary |
| Other Terms | Lender types input | AI Provides Indicator (green, yellow, red) & basic commentary |

SUBMIT TO BORROWER

Fig. 22

ARTIFICIAL INTELLIGENCE DERIVED ANONYMOUS MARKETPLACE

CROSS REFERENCE TO RELATED APPLICATIONS

This application is a non-provisional application that claims the benefit of U.S. provisional Application No. 62/567,293, filed on Oct. 3, 2017, the contents of which are herein incorporated by reference in their entirety.

FIELD

This invention relates to a computerized system using artificial intelligence and an electronic chat room to create an anonymous marketplace.

BACKGROUND

Obtaining a commercial loan requires finding a lender that meets the borrower's needs. Whether in person or through an electronic marketplace, the process requires multiple meetings, conversations and possibly presentations that absorb the time of both the lender's and borrower's management teams. Currently, there is no way to determine if a lender can lend to a specific borrower or a specific project in advance of the lender knowing the borrower's identity and financing request specifics. Currently, the primary way to reduce the time to receive a formal proposal is to limit the number of lenders invited to a deal; however, this often results in sub-optimal terms, including a failed deal, due to either an unwillingness to spend the additional time required to investigate a larger number of lenders or a lack of awareness of lenders.

The current process typically involves the borrower identifying a select group of lenders, which are primarily lenders known to the borrower through personal relationships. The lenders will then commence two levels of the diligence: the initial level is diligence conducted to determine if the borrower's request falls within the risk parameters of the lender such that they can provide a Terms Sheet; the second level is diligence is a much more robust and detailed process that is conducted only if the borrower has agreed to their Terms Sheet.

In the initial level of diligence, the borrower and lender connect in person or telephonically several times to discuss all aspects of the business and financing request. The lender may request financial statements and other diligence items to be sent via email, courier, or mail. Several rounds of questions between the lender and borrower will be asked and answered via email, phone, and in person meetings. This process can take weeks or months. To meet the borrower's funding timeline this process must occur with all other selected lenders concurrently, which absorbs a significant amount of the borrower's time. A lender will not know whether the loan request falls within their risk parameters until the end of their initial diligence process. If the deal does fall within their risk parameters, then they will be able to provide a term sheet for the transaction. The borrower will then need to decide which lender is best suited to win the business after manually comparing each of the term sheets.

Currently, to help run a more efficient process, borrowers utilize human intermediaries, such as investment bankers, who are familiar with many lenders and their underwriting parameters. However, this methodology is often a process whereby the intermediaries are unable to know who exactly will do the transaction. This uncertainty is driven by the fact that even though lenders have set underwriting policies, those policies are modified regularly. Additionally, lenders are capable of making decisions outside of their guidelines depending on certain circumstances. Due to policy changes, lender performance, market conditions, lender competition, and other factors, no human intermediary has the capacity to know all of the exceptions, trends, or underwriting policies for each lender in real time such that they could predict with certainty the lenders that will be willing to underwrite a deal as well as predict the terms that are likely to be offered.

When the lender prepares the term sheet, it does not know what the other lenders are providing and, therefore, will not know if any or all their terms are either out of market or not competitive until after they have delivered their term sheet and have heard back from the borrower. Lenders are not guaranteed a second chance at revising terms and so there is a business desire to having an indication of whether a lender's proposed terms are in market before the term sheet has been delivered.

The credit markets for lenders and borrowers are opaque, which makes it difficult for both lenders and borrowers to understand what they could do to win more business and improve the terms of their credit facilities, respectively. Lenders often are not aware of why they lost deals because the borrowers are often prohibited from doing so through non-disclosure agreements and because borrowers have no incentive to share the specific reasons and factors that led to them selecting one lender over another. As such, lenders are often unable to understand why they lost business, which makes it more difficult to determine strategies to improve the probability of winning new business.

Borrowers often are not aware of the specific detail of the risk rating system that a lender may be using to determine the size and terms of a proposed credit facility. This lack of understanding makes it very difficult for a borrower to develop financial strategies to improve their financial standing in the private credit markets. A better understanding of the impacts of elements of their financials and operations would help a borrower make better business decisions to improve their credit capacity.

BRIEF SUMMARY

Given the foregoing, what is needed is a system and method that improves the timing and success rate of the initial diligence processes, including the identification and intelligent autonomous matching of lenders and borrowers, enabling borrowers to receive higher quality term sheets, and exposing lenders to more potential opportunities.

In an embodiment of the present disclosure, a cloud-based autonomous marketplace system consists of a server that extracts borrower data that includes financial, industry operational and business data. The system also extracts lender data from prospective lenders including financial data and a target profile for each prospective lender. It then generates, using computer based artificial intelligence, an autonomous ranked match of prospective lenders, wherein the artificial intelligence is used to identify relationships between the borrower data and the prospective lender data to generate the ranked match based on a preference of the borrower and a correlation between the identified relationships. Further, the artificial intelligence for identifying relationships evolves through machine learning derived from a collective intelligence of mass participation. The system also creates and hosts an internet based chat room where the borrower enters the internet based chat room and upon entering, the identities of the prospective lenders are revealed. In addition, the borrower, within the internet based chat room, selects one or more prospective lenders to receive a finance request, and after selection by the borrower, the selected prospective lenders are first notified and informed of an existence of the finance request of the borrower.

In an embodiment of the present disclosure, a processor executes instructions that cause the processor to dynamically extract and autonomously match one or more prospective lenders and a borrower. The extracting and autonomously matching includes the extraction of borrower data that includes financial, industry operational and business data. The instructions also include the extracting of lender data from prospective lenders that includes financial data, a target profile, and historical deal data for each prospective lender. The instructions then generate, using computer based artificial intelligence, an autonomous ranked match of prospective lenders, wherein the artificial intelligence is used to identify relationships between the borrower data and the prospective lender data to generate the ranked match based on a preference of the borrower and a correlation between the identified relationships. Further, the artificial intelligence for identifying relationships evolves through machine learning derived from a collective intelligence of mass participation. The instructions create and host an internet based chat room where the borrower enters the internet based chat room and upon entering the identities of the prospective lenders are revealed. In addition, the borrower, within the internet based chat room, selects one or more prospective lenders to receive a finance request, and after selection by the borrower, the selected prospective lenders are first notified and informed of an existence of the finance request of the borrower.

In an embodiment of the present disclosure, a method is disclosed that includes the extraction of borrower data that includes financial, industry operational and business data. The method also includes the extracting of lender data from prospective lenders that includes financial data and a target profile for each prospective lender. The method then generates, using computer based artificial intelligence, an autonomous ranked match of prospective lenders, wherein the artificial intelligence is used to identify relationships between the borrower data and the prospective lender data to generate the ranked match based on a preference of the borrower and a correlation between the identified relationships. Further, the artificial intelligence for identifying relationships evolves through machine learning derived from a collective intelligence of mass participation. The method includes the creating and hosting of an internet based chat room where the borrower enters the internet based chat room and upon entering the identities of the prospective lenders are revealed. In addition, the borrower, within the internet based chat room, selects one or more prospective lenders to receive a finance request, and after selection by the borrower, the selected prospective lenders are first notified and informed of an existence of the finance request of the borrower.

Current commercial lending systems are processed on a per transaction basis, i.e., systems that process individual lending transactions between a borrower and lender. The current disclosure is a new approach that applies proprietary machine learning algorithms to a data set that includes lender data, borrower data, existing loan data, and industry-wide banking statistics.

Constantly learning matching algorithms are used to identify lending opportunities for lenders and borrowers that would be otherwise inaccessible. For example, a borrower may have closed on a loan with defined terms six months ago and not be seeking additional or replacement financing, but the system has the ability to identify a lender that is now able to offer better terms to the borrower (based on more recent lending data, borrower data, and/or other data points), thereby creating an opportunity for the lender to provide financing where they would have otherwise been unable to and enabling the borrower to put financing in place with more favorable terms.

The present disclosure does not simply automate or facilitate existing processes for commercial lending. Rather, the disclosure establishes a new, otherwise impossible, computer based technology for commercial lending. In an embodiment, the present disclosure functions anonymously through a network chat room that facilitates lending connections without revealing either party's identity (borrower or lender) until each party electronically decides to disclose their identity. The algorithms used to discover financing matches are not dependent on the identities of either party. This approach improves and replaces the existing commercial lending process through the utilization of anonymous computer based chat rooms, thereby increasing the efficiency of the computerized lending process.

Further features and advantages of the present disclosure, as well as the structure and operation of various embodiments of the present disclosure, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the relevant art(s) to make and use the present invention.

Additionally, the left-most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which are the same in structure, operation, or form but may be identified as being in different locations in space or recurring at different points in time (e.g., reference numbers '110*a*' and '110*b*' may indicate two different energy detection devices which are functionally the same, but are located at different points in a simulation arena).

FIG. 10 illustrates a view of a lender dashboard, according to an embodiment of the present disclosure.

FIG. 13 illustrates an image of a dashboard view showing a credit explorer screen for a borrower, according to an embodiment of the present disclosure.

FIG. 14 illustrates an image of a dashboard view showing a credit explorer screen summary of potential and pending loan requests, according to an embodiment of the present disclosure.

FIG. 15 illustrates an image of a dashboard view a bank match screen showing a listing of anonymous, ranked, potential lenders, according to an embodiment of the present disclosure.

FIGS. 16A and 16B illustrate an image of a guided credit proposal template, according to an embodiment of the present disclosure.

FIG. 17 illustrates an image of a secure data chat room, according to an embodiment of the present disclosure.

FIG. 21 illustrates an image of a screen where users can edit or enter financial information, according to an embodiment of the present disclosure.

FIG. 22 illustrates an image of a lender real-time feedback screen, according to an embodiment of the present disclosure.

Figure 1:
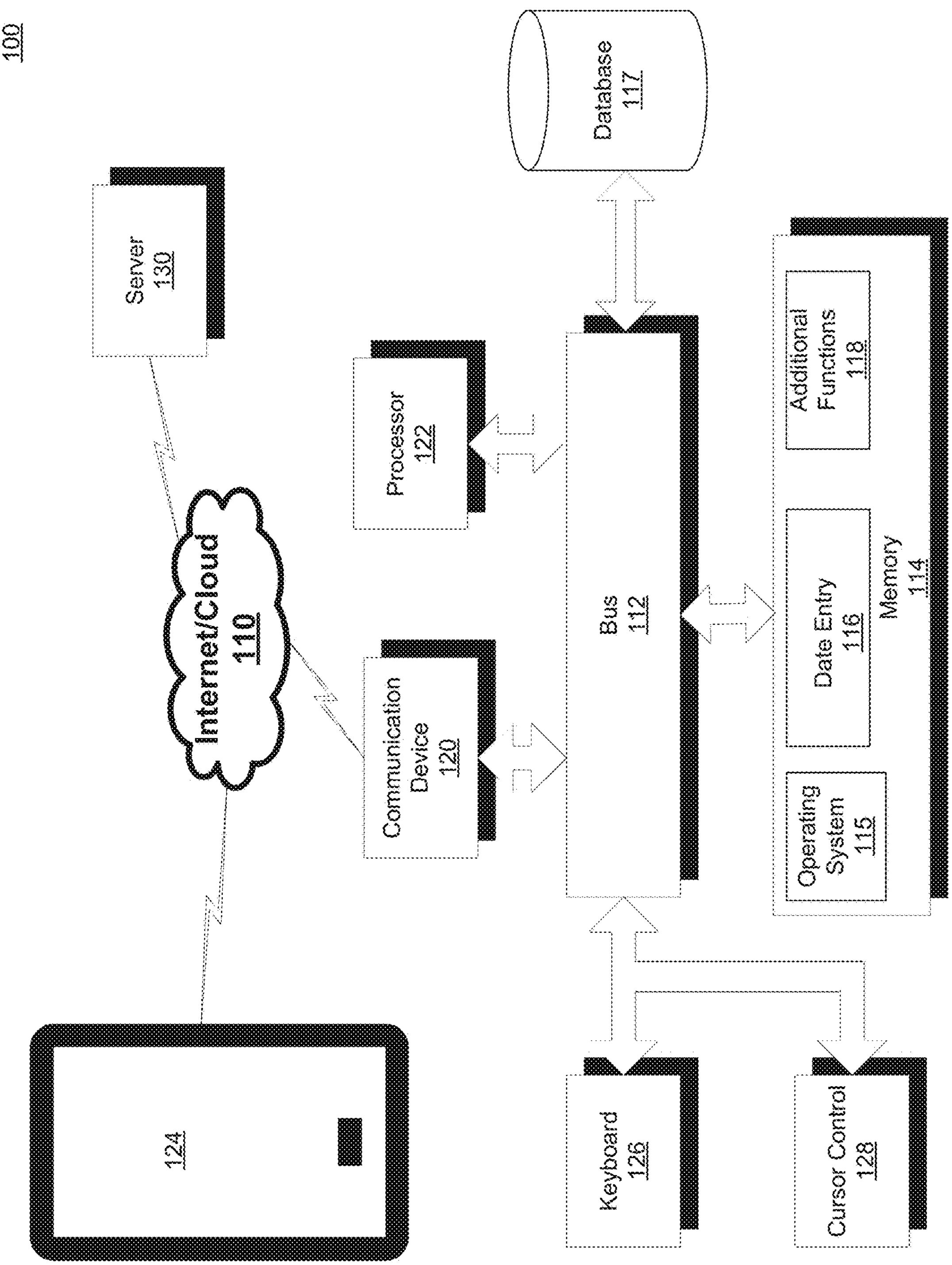
FIG. 1 is a block diagram of a computer server or system in accordance with embodiments that can implement any of the disclosed components herein.

Further embodiments, features, and advantages of the present invention, as well as the operation of the various embodiments of the present invention, are described below with reference to the accompanying figures.

DETAILED DESCRIPTION OF THE INVENTION

While embodiments described herein are illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

The present application relates generally to generating an anonymous marketplace to facilitate commercial lending and commercial borrowing, and more particularly to a form of artificial intelligence that evolves through machine learning derived from the collective intelligence of mass participation of commercial lenders and commercial borrowers. The artificial intelligence is designed to have the capacity to analyze and learn from data collected in various databases to determine what comprises a similar company and a similar deal and therefore accurately identify trends and patterns associated with those groupings that can be used to, among other things, identify relevant lenders, provide key business strategy insights, reduce costs of lending, reduce costs of borrowing, improve terms, increase the transparency of credit markets, identify financing opportunities, and predict financing terms rapidly, anonymously, and accurately. The invention will also present certain elements of the data in graphical user interfaces (GUIs) to help the borrower interpret the data more quickly than current computer based systems.

There is a business desire for a method, process and system that allow for artificial intelligence to learn how to better determine similar borrowers and determine similar credit facilities and deal structures. Borrowers and deal structures are subject to constantly changing internal and external criteria. Internal criteria may include financial performance, company operations, strategic plans, and internal forecasts. External criteria may include economic trends, competitor performance, and industry regulations. In addition to these ever changing internal and external factors, lenders themselves are constantly evolving their lending policies and risk parameters. It is not possible for a human to consistently track and analyze these countless factors continuously over time and translate the analysis instantly into actionable data for an individual borrower; however, this invention involving artificial intelligence does have this capacity because it is a dynamic and evolving system that is capable of tracking countless factors continuously over time including the detection and adoption of new factors and can then generate actionable information and identify relevant opportunities through the collective intelligence derived from information collected and stored in secured databases.

There is a business desire to better understand the credit markets, timing, and terms associated with various forms of financing, and to do this on a continuous basis, because this information is constantly changing and this information is required to make better and faster decision making related to financing.

Currently, lenders analyze risk of a financing opportunity in many ways and methods, but the risk analysis for very small deals and the risk analysis for large deals are not tailored to the particular deal. Rather, generally risk analysis is standardized using personal credit scores and public debt ratings, respectively. In very large financings it is not uncommon for the debt facility to be publicly rated by paying a fee and spending time working with rating agencies such as Moody's and S&P to determine a rating for the borrower and the deal. In smaller financings to smaller companies it is not uncommon for a lender to require a financially strong individual to be a co-borrower of the loan, which means the risk associated with the credit facility can be underwritten using the individual's personal credit score. Both the personal credit score and the public debt ratings are widely recognized by lenders as trusted and accurate indicators of risk for loans, such that they can group similar loans and similar deals based on those ratings. Lenders can input the personal credit score or public debt rating into their risk rating systems and can quickly and easily see terms of comparable borrowers and comparable credit facilities not only from their own databases, but also from publicly or semi-publicly available sources.

Private companies that can be stand-alone borrowers, e.g., meaning that they don't need a financially strong individual to guaranty the loan personally, in order to borrow, often choose to avoid the cost of acquiring a public debt rating, are subject to a different set of underwriting standards for each lender they approach with their financing request. Because of the different and continuously changing underwriting standards, lending institutions have difficulty grouping similar companies and similar loans for private companies with unrated private debt. Additionally, borrowers have difficulty anticipating what terms they may qualify for without each lender collecting information and performing their own separate analysis.

There is a business need to have a system and method similar to a personal credit rating or a public debt rating for private deals to allow for more accurate groupings because that will allow the lenders to better understand the credit markets, provide more consistent loan terms, and develop better strategies and loan products to meet the needs of borrowers of certain risk levels. Additionally, this information will allow borrowers to better anticipate potential terms and business possibilities.

The claimed system and method utilize artificial intelligence that evolves through machine learning, as will be explained in more detail, from data collected and stored in secured databases from the collective participation of lenders and borrowers. The system's artificial intelligence has the capacity to analyze and learn from data collected in various databases to determine what comprises a similar borrower and a similar deal and can then identify patterns of their credit facilities, credit requests, and credit offers to generate personalized and actionable information to both borrowers and lenders. By using the artificial intelligence to determine similar borrowers and similar deals, the system can dynamically generate several outputs that are beneficial to both borrowers and lenders. For example, the system can generate the various outputs including, but not limited to, a spectrum of predictive terms of credit facilities that could be achieved in the market for a specific borrower, the number of relevant lenders in the market that could provide that financing for a specific financing request and the means to connect with them, identification of the factors of the borrower that negatively or positively impacted the credit strength of the borrower, identification of the factors of the credit facility that negatively or positively impact the ability to find relevant lenders, dynamic and real time indications of competitiveness of specific terms a lender is considering providing to a borrower prior to delivery, feedback of reasons why a lender lost a deal, etc.

The present invention uses artificial intelligence to interpret data and evolve as new data is added. The data can be stored in secure databases and collected from a web platform that allows borrowers and lenders to input information, communicate, and transact. The invention allows for user participation, dynamic content, metadata, scalability, while being open to collective intelligence by way of user participation and machine learning.

The claimed invention entails a method and system based on using artificial intelligence that will continuously analyze data to group similar borrowers and similar credit facilities for the purposes of identifying historical patterns and trends and predict future trends and patterns, which allows the system to rapidly generate actionable intelligence for borrowers and lenders to realize business benefits. For example, actionable intelligence could help reduce costs associated with borrowing and lending, increased visibility of financing opportunities, improve business strategies for achieving stronger credit worthiness for borrowers, improve business strategies for increasing lenders' probability of winning deals, and other similar benefits.

The system and method utilizes a software-guided process to collect a set of data inputs related to commercial financings such as loans, letters of credits, lines of credit, term loans, bridge loans, revolvers, leases, and other credit facilities which may be $50 thousand USD through $500 million USD or above in size. The loans may be requested by the borrower virtually any type of financing including working capital, real estate financing, equipment finance/leasing, aircraft leasing, refinancing of existing debt, mergers and acquisitions financing, dividend financing, general corporate purposes, sale lease back transactions involving real estate or equipment, and other purposes. Collected data points will also include risk parameters of the lenders, existing credit facilities that are loaded onto the platform, market data collected from lenders, economic data sourced from the federal reserve, e.g., Federal Reserve economic data, and other macro-economic sources, lender bids on loan requests, failed lender bids, successful lender bids, bid response times, deal closing response times, failed borrower requests, successful borrower requests, financial information of borrowers, operational information of borrowers, the trends of all data collected, etc. The artificial intelligence may review all the collected information, which may include more data points than are listed within this application, and will dynamically generate many outputs for the business benefit of both the borrowers and lenders. Specifically, the method and system map historical trends of the types of borrowers that were achieving certain types of credit facilities and also include cataloguing the strength of the borrowers, such as their cash flows, income statement performance, balance sheet strength, growth trends, etc. The system can also catalog and match those borrowers with the loans they hold and the details of those loans such as pricing, collateral, covenants, loan amount, amortization, and terms. The system can analyze the performance of those borrowers and credit market trends at the time of originating the loan instead of their current performance. Then the system can use those loan terms as a base that will be adjusted depending on several system determined factors such as the length of time since the loan was originated, the resulting market trends, changes in lender behavior, changes in lender risk parameters, changes in company performance, and others to generate a prediction of likely terms a borrower may be able to clear in the market depending in the current times. The system determines which factors are most relevant based on its ability to determine which metrics are the primary factors driving the lenders' proposals.

In order to properly compare borrowers and deals, the system can consider additional factors such as the financial performance and standing of the borrower, which may be derived through financial statements; the operational performance and standing of the borrower, which may be derived through a series of data points inputted by the borrower; risk parameters of the lenders on the system; financial performance and standing of borrowers, which are deemed to be similar by the system; operational performance and standing of borrowers, which are deemed to be similar by the system; existing loan terms and characteristics of the borrower; existing loan terms and characteristics from similar borrowers with similar loans as determined by the system; market trends at the time of the new loan request compared to the market trends at the point in time of the origination of existing loans being used as comparisons, and other factors that the system may identify as relevant and important to track and include in the decision making process. Additional factors that the system may include may be added upon the inclusion of new lender risk parameters, which the lender may add or modify in their profile on the system over time. As lenders create or modify risk parameters, the system will modify and collect corresponding new data points from the borrowers and will evolve its decisions making algorithms to include those new factors.

The system can make decisions about the weighting of the factors listed above when determining which set of comparable deal terms should be used in predicting likely lenders and likely terms that a borrower could expect to receive. The system will be considering the similarities between financials, operations, and industries of the borrowers, as well as the similarities of the deal factors, as well as the time of when those comparable loans were originated and the state of the respective borrowers' financials and operations were at the time of those originations, to the extent that information is available, then the system will use this comparable data almost exclusively with a relatively minor weighting of market trends data. If information is not available, the system will weigh market trend information much more heavily and will use recent trends to predict terms based on what the market trends were at the time of loan originations and then will trace trends back to the date of the loan request to predict likely terms. Additionally, as time passes since a deal was originated it will be less relevant than more current deals. As such, the system may make judgments between less similar deals that have originated more recently than more similar deals which may have originated earlier in time.

The system evolves by comparing the system predictions with the outcomes of the deal bidding on the system as well as new loan and borrower data that enters onto the system. To the extent that proposed lender bids on prospective deals varies outside of a predetermined range of error, then the system will adjust its algorithm on its own by changing the weighting of certain data factors and or by changing the weighting of entire data sets, for example, whether it may apply less or more weighting to market trends. Therefore, the system is designed to evolve on its own making it faster, more accurate, and more valuable.

The invention leads to a higher probability of borrowers finding better terms for requested financing, reduced costs for lenders related to identifying loan opportunities, and reduced time involved to negotiate term sheets for both the borrowers and the lenders. Additionally, the invention will analyze, track, and record data involved in these processes to help lenders innovate by giving them data to create new loan products, better service models, and differentiated brands. The current invention will also lead to faster responses from lenders due to the curated data metrics extracted from the borrower's operations and history. Over time, the curated data metrics will evolve through machine learning as the lenders evolve their own risk parameters, which will then automatically influence and develop the borrower data metrics, which are extracted.

There is a likelihood that the loan market will increase in both market size and deal flow velocity due to the reduced time and cost related to launching a deal, increased market transparency, the creation and distribution of new loan products created with the metadata and data from the system by lenders in the market, and predictive algorithms.

Prior to this invention, borrowers have not been able to estimate potential terms on a continuous basis. Each of the lenders has to conduct their own analysis and due diligence processes to determine what terms might be possible. The terms provided by the lenders would only reference a particular point in time.

New loan products are hard to create because the available financial market data for private commercial loans and leases is privatized in different financial institutions. The current invention aggregates not only loan data on closed loans but data on discarded loans that did not clear the market. This will allow new loan products to be designed for lenders to offer and distribute in the market.

The present invention provides a computer-based system and method that allows commercial borrowers and lenders to match and to communicate and negotiate terms for commercial loans and leases. Collaborative technologies manage the development of the data metrics collected from the borrowers, which in turn may be guided by a designated manager. The system also allows for the borrower to see historical trends of loan terms such as pricing, collateral, loan amount, and amortization, and other terms as well as predict similar loan term metrics for what a borrower of similar industry, credit metrics, and business trends could receive based on where lenders were bidding on similar deals at that time.

To anonymously match borrowers and lenders, the system must be able to predict a lender's willingness and ability to provide financing for a borrower's loan request. Order of decision making is important to the accuracy of the generated output. As such, the system must first determine if the lender can provide financing to a borrower and then, secondly, it must decide if it can provide the certain type of financing requested. In order for this to be anonymous, the system and method cannot include the contacting of lenders about the request. Instead, the system must analyze the data collected about the lenders and use its artificial intelligence to determine if any lenders are capable of providing financing. To accomplish this certain business and financial data need to be collected about the borrower and lenders, as well as the requested financing. The borrower must input a set of recent financial statements and answer several questions related to their business, operations, and ownership. The system will collect and store criteria detailing the types of companies and types of loans that lenders are able to finance. Finally, the borrower will input specifications of the type of financing for which they are interested in getting term sheets. The borrower can also indicate their preferences regarding the type of lender they would like to respond. The system will take all this information into account along with other collected data to identify potential lenders for the borrower's financing request by considering the borrower's business, operations, financials, requested deal factors, the borrower's lender preferences, the lender's deal criteria, macro-economic data, and identified patterns based on recent similar deals of similar companies.

Throughout the process to this point, the lenders will not be aware that this specific borrower is actively preparing a deal or seeking lender interest, thus maintaining anonymity of the borrower. The number of matching lenders will be returned to the borrower, but the borrower will not be able to see any of the lender names; however, they may see other details such as the strength of the match, thus maintaining anonymity of the lender. The borrower will have the option of determining how many lenders they want to bid on their deal. Anonymity is an essential component of the invention as it not only prevents discrimination, but it also allows a borrower to prevent itself from informing the market that a potential transaction is being launched. Further, in the case where a transaction does not result in any matching lenders, the borrower will have avoided any possible public relations impact of rescinding a deal after a public announcement.

The borrower will then answer more detailed questions about their business, operations, and requested deal. Once that has been completed, then the borrower will have the ability to provide data, reports and financials into an internet based data chat room. Conference calls with the lenders can be coordinated through an internet based data chat room, and borrowers can receive, track, and answer questions from the lenders. The system will also allow the borrower to control the lenders' access to the site and will allow the borrower to track activity. After the end of the time limit, the lenders will be required to provide term sheets indicating their level of interest and under what terms. At that point, the borrower is free to close access to all parties except the selected lenders. The internet based data chat room can continue to be used to communicate and trade documents throughout the deal closing process.

The invention is based on the use of Artificial Intelligence (AI) to implement and expand the system's capabilities. The key characteristics of the AI are its ability to identify relationships between data sets, identify comparable and similar data sets to a particular borrower and/or credit facility, set risk categories of borrowers and credit facilities, adapt as data sets grow and change, and most importantly, evolve its code on its own, specifically to further develop the initially pre-programmed instructions inputted into it, in order to become faster, more intuitive, and more intelligent than human counterparts could ever become. This AI self-evolution is based on variances in patterns the AI detects in newly collected data versus the predictions it had generated.

The AI will be preloaded with an initial set of guidelines for handling data upon which it will generate its own categories for similar borrowers, generating categories for similar deals, generating categories for similar deals of similar borrowers, identifying likely lenders, identifying unlikely lenders, generating projected deal terms, setting risk categories, projecting debt capacity, projecting ranges of specific deal terms, generating recommendations to help lenders win more business, and automatic evolution of the AI's preloaded initial set of rules. The evolution of the AI will be generated based on the actual outcomes versus the AI's generated output, e.g., deal terms, similar companies, similar deals, lender recommendations, etc.

Upon the recognition of a variance between what the AI projected and the actual outcome, the AI may generate a categorization of the size of the variance, and may generate a recommended course of action which it will do automatically and thereby alter and develop its pre-programmed list of instructions.

For clarity, the following definitions are provided:

Borrower Data: types of inputs for identification and analysis may include Borrower Financial Data, Borrower Operational Data and Borrower Deal Data.

Borrower Financial Data: This is data related to the budget, forecast, projections, and financial statements, e.g., balance sheet, cash flow statement, income statement, accompanying detail and notes of a specific borrower. Financial data also includes the trends from year to year.

Borrower Operational Data: This is any data pertaining to a borrower that is not included or collected in the Financial Data. For example, Operating Data could include ownership information, management changes, years of existence, pending law suits, industry type, geography, foot print, international presence, etc.

Borrower Deal Data: This is data related to a credit facility of the borrower and could include the following information: credit facility type, amortization, term, pricing, collateral, guaranty requirement, payment structure, covenants, origination date, etc. Market Data: This data may come from lenders, banks, government agencies, various online news sources, the Federal Reserve economic data publications, etc. The data may include information and data metrics about loans closing in the market, the lending behaviors of banks, the lending behaviors of non-bank lenders, various interbank borrowing interest rates, inflation, deflation, stock market performance, employment and payroll trends, and many other kinds of outside the platform market information about the economy. The information could be used to determine the state of the local, regional, national, and global economies and how it would relate to financial performance, lender behavior, and credit facility term tightening or loosening.

Financial Database: This is the database of all the Financial Data of the borrowers that have inputted data within the system.

Deal Database: This is the database of all the Financial Data of all the borrowers that have inputted data within the system.

Initially, the AI is assigned certain anchor mechanisms to have some basis of grouping certain borrowers. Though any item of Financial Data or Operational Data could be used as an anchor factor, a few sample anchor factors are listed below. Over time, the AI will consider additional anchor factors and will evolve based on observations and analysis of the data and behavior on the system. How the AI can do this will be described later in this application.

Industry: Certain industries will be grouped together. For example, manufacturing and service companies may be grouped separately from the hotel industry and restaurant industry.

Revenue Size: Certain revenue ranges will be used as groupings. For example, borrowers with revenues between $10 million and $50 million may be their own category, but borrowers between $51 million to $250 million may be separately categorized.

EBITDA Size: Certain EBITDA ("earnings before interest, tax, depreciation and amortization") ranges will be used as groupings. For example, borrowers with EBITDA between $1 million and $50 million may be their own category, but borrowers between $51 million to $100 million may be separately categorized.

Ownership: Certain EBITDA ranges will be used as groupings. For example, borrowers with EBITDA between $1 million and $50 million may be their own category, but borrowers between $51 million to $100 million may be separately categorized.

Borrower Risk Category: A risk category may be assigned to certain borrowers that have a combination of factors or qualities that align with the AI generated risk category. The risk category will help the AI system determine the likelihood of finding a lender to provide financing to that specific borrower. For example, the risk categories could be labeled 1 through 10 with 10 being the most risk borrowers or deals and 1 being the safest borrowers or deals.

Other metrics: Over time the AI could determine that other metrics should be extracted to increase the accuracy of its decision making, generated predictions, and analysis. The AI would be able to derive better anchor mechanisms that result in better identification of potential lenders, easier creation of new loans and loan products, as well as more accurate predictions of likely terms for prospective deals.

Credit Facility Deal Parameters: Inputs that allow identification and groupings may include the following:

Credit Amount: The size of the credit facility

Pricing: The borrowing index and the credit spread of the loan. Fees, commitment fees, unused fees, prepayment fees, and any other fees or costs related to the loan.

Amortization: The amortization of the credit facility and details of the balloon payment if applicable.

Collateral Advance Rates: The advanced rates of accounts receivable, inventory, equipment, marketable securities, cash, real estate, etc.

Guaranty: The requirement of a personal guaranty and the details (Financial Data and Operating Data) of the guarantor(s).

Term: The term of the loan and the maturity date of the loan.

Type: The type of credit facility, for example, revolving credit facility, term loan, letter of credit, equipment financing, sale lease back, operating lease, capital lease, aircraft lease, etc.

Deal Risk Category: A risk category may be assigned to certain credit facilities/deals that have a combination of factors or qualities that align with a risk category. The risk category will help the AI system determine the likelihood of finding a lender to provide financing to that specific deal. Over time the AI will automatically develop the characteristics of risk categories and may even add or remove certain categories.

Initially, the AI is assigned certain anchor mechanisms to have some basis of grouping certain credit facility deals. Though any item credit facility inputs could be used as an anchor factor, a few sample anchor factors are listed below. Over time, the AI will consider additional anchor factors and will evolve based on observations and analysis of the data and behavior on the system.

Type: The type of credit facility, for example, revolving credit facility, term loan, letter of credit, equipment financing, sale lease back, operating lease, capital lease, aircraft lease, etc.

Term: The term of the loan and the maturity date of the loan.

Amortization: The amortization of the credit facility and details of the balloon payment if applicable.

Risk level of the deal: A risk category may be assigned to certain deals that have a combination of factors or qualities that align with a risk category. The risk category will help the AI system determine the likelihood of finding a lender to provide financing to that specific borrower. Over time the AI will automatically develop the characteristics of risk categories and may even add or remove certain categories.

Additional term and concept definitions related to the invented artificial intelligence are as follows:

Market Data and all other data from network Borrowers: This is a combination of Market Data and risk parameters, which are derived by weighted averages of terms of deals of comparable borrowers. Note that the groupings of comparable borrowers and the weighting of terms are initially hard coded, but evolve over time through AI based on the data inputted into the system.

Comparable Borrower Data Set Parameters: A comparable borrower data set is the grouping of certain companies based on the Rules and Behaviors of Handling Data. Once these companies are grouped, the system will group similar credit deals, based on the Rules and Behaviors of Handling Data, and will average the terms of those grouped deals based on weightings. The weightings are derived by certain factors, for example, a factor may be the time since the deal closed compared to the trends of the market based on the Market Data since the deal was closed. The system will have certain factors hard coded initially, but will evolve those factors over time based on new data inputted into the system.

Comparable Borrower Deal Data: This is derived from a set of data of comparable borrowers. Once the comparable borrowers are grouped, using the Rules and Behaviors of Handling Data, the system will be able to group the credit deals related to those common borrowers. From those deals, the system will use the Rules and Behaviors of Handling Data to determine which deals are similar and which are not based on the Anchor Mechanism, which is part of the Rules and Behaviors of Handling Data. The similar deals identified and their corresponding terms and weightings (level of similarity) is the Comparable Borrower Deal Data, which represents similar deals of similar borrowers.

Risk Parameters of Network Lenders: Lenders that have profiles on the platform are considered "Network Lenders." Network Lenders need to input their risk parameters as part of their setup process. These parameters serve as guidelines for the types of borrowers, deals, and risk they are interested in bidding on. Sample parameters could include leverage levels, revenue size, EBITDA size, ownerships, geography, and an assortment of other ratios, financial and non-financial factors.

Recent deal closing data from lenders: There are two ways to get data about recent deal closings. The first way is to get the Final Deal Terms as originated and closed on the system. The second way is by looking at the existing deals entered into the system from borrowers on the platform. The most valuable and useful data for the system to generate the most accurate results is closed deal data and a set of two years of corresponding financial data. However, by using Market Data, risk categorization, weightings, and other data, the system is able to use recently closed deal data even if there are no associated financials for the period that the deal was closed.

Identified likely lenders: These are the lenders in the network that are identified by the Rules and Behaviors for Handling Data as a lender that has historically done deals like the proposed deal. Additionally, it will look at the current risk parameters of that Lender and will determine if the proposed deal falls within those parameters or a certain margin of error of those parameters. The Rules and Behaviors will also consider the preferences of the borrower. Upon weighing all of these factors, the system will be able to both identify likely lenders and rank those lenders in an order based on the preferences of the borrower and the likelihood of the ability for the lender to fulfill the deal.

AI Projected Terms: These projected terms are derived from the all the data in the system, e.g., market data, borrower data, lender data, historical data, etc., and the output predictions of the current Rules and Behaviors for Handling Data, as influenced by the Artificial Intelligence.

Artificial Intelligence (AI): The artificial intelligence is the dynamic decision making engine that is designed to make modifications and changes to the Rules and Behaviors for Handling Data to the extent it can derive improvements. The AI will make it possible for the decision making of the system to define and measure the relationship between the Market Data, Borrower Risk Category, Borrower Financial Data, and Borrower Operational Data, and the Risk Parameters of Network Lenders. It will also be able to measure how the relationship changes over time and can automatically implement modifications and changes to improve the Rules and Behaviors so that they adapt in sync with those relationship changes.

The AI will make these changes not only by changing the mathematical formulas and relationship weightings, risk categorizations, and grouping anchor mechanisms, but will be able to introduce brand new data metrics that it otherwise was previously not capturing or previously not considering even though the data may have been collected. The AI will be able to do this by altering the types of information captured from the borrowers through increasing the questions required to be answered by the borrower to access the system and/or launch a deal request, and utilizing new metrics already captured but previously unused in the analysis, e.g., it is possible that certain elements of collected data would not have a value to the matching process initially, but over time as more data is entered into the system those pieces of data may become useful and relevant factors that should be considered. The AI will be able to suggest new changes to the Rules and Behaviors, such that the outputs, e.g., groupings of borrowers, groupings of lenders, groupings of deals, prediction of terms, categorization of risks, identification of likely lenders, analysis of the market, and other outputs that the system may generate, of the Rules and Behaviors for Handling Data will be more accurate, faster, and more valuable.

Rules and Behaviors for Handling Data (Rules and Behaviors): The Rules and Behaviors will initially be hard coded, but over time will be modified automatically through Artificial Intelligence. They will use anchor mechanisms for grouping similar borrowers and similar deals. They will predict loan terms based on the similar deals of similar borrowers. They will be able to identify lenders likely to be able to fulfill borrower deal requests. They will use weightings, time, Market Data, and all other data inputted into the system, including borrower data and lender data, to group similar borrowers, group similar deals, identify likely lenders, identify new loan products that could be successful in the market if offered, identify lender strategic weaknesses, identify reasons for why a certain lender won or lost a deal, predict deal terms for a specific borrower, categorize borrowers and deals within certain risk categories, and conduct financial analysis, and collect and generate data points necessary to generate data visualizations.

Final Deal Terms: These are the terms that will become the "Borrower Deal Data" and assumes that the loan eventually closes with the same terms as proposed by the lender. These are the terms that the Borrower has decided to select out of all the bids they received for a prospective credit deal bid out on the platform. Additionally, final deal terms may include credit deals inputted into the system even if the deal was not originated on the platform.

Actual Terms Received from all Lender Offers (Actual Terms): These are the terms that lenders have sent in as bids to the borrower during a bidding process of a credit deal through the data chat room. Typically these terms are derived from the term sheets provided by the lenders that indicate what kinds of terms they would consider providing to the borrower for the borrower's request based on the information they received in the data chat room.

Risk Parameters of Likely Lenders: The likely lenders identified by the borrower all will have risk parameters loaded into the system. This is required as part of their sign up and registration on the platform. The risk parameters are indications of the types of deals, borrowers, and risk that the lender is targeting. The parameters could include leverage levels, ownership types, revenue ranges, and any other financial, non-financial, and/or operational metric. The lender has the option of modifying these risk parameters over time and has the option of adding new custom parameters.

Data Chat Room: The Data Chat Room, also referred to as the internet based data chat room, is where borrowers and lenders communicate and exchange information. The borrowers will be able to setup conference call meetings with the lenders. The borrowers will also be able to post their financial and operating information as well as specifics about their credit request. The lenders will be able to download the information and will be able to submit term sheets. The term sheets could be submitted as a static document uploaded onto the data site or the term sheet could be entered in digitally through a term sheet module. The module allows the lender to input and form the term sheet dynamically, so that the lender can receive instant feedback generated by the system. The feedback can be provided immediately upon the lender typing in the terms and, more importantly, before submitting the term sheet to the borrower. The feedback provided gives an indication of the relative standing compared to other term sheets that have been submitted as well as Comparable Borrower Deal Data. The Lender can then ensure that they are providing more competitive terms if they are able. Further, the borrower has the ability to control a prospective lender's access within the data chat room and also track a prospective lender's actions within the data chat room.

All Data: All data includes all data collected, generated, and derived by the system including market data, borrower data, deal data, lender data, deal history, projected deal terms, variances between projected deal terms and actual deal terms, lender risk parameters, risk categorizations, etc.

Calculated variance between Projected Terms and Actual Terms, e.g., Calculated Variance, is where the system will review each of the deal terms of the Final Deal Terms received from a loan originated on the system using the data chat room. A variance will be calculated compared to the value for each term as projected by the system based on the AI and Rules and Behaviors for Handling Data. Definitions for the associated terms are as follows:

Variance Thresholds: Thresholds will be established based on certain levels of variance of the Calculated Variance. The thresholds will determine the importance level of seeking a corrective action to modify the Rules and Behaviors for Handling Data. For example, if the variance is a low threshold then the system will make no changes to the existing Rules and Behaviors; however, if the Calculated Variance crosses a high threshold, then the system will Automatically Implement Corrective Measures based on the Determined Corrective Action.

Categorization of Variance (material or immaterial): When the Calculated Variance is derived, the system will decide as to whether the variance is material or immaterial. The system will determine this based on thresholds hard coded into the system. It may at some point contain enough data to automatically set its own thresholds as part of the AI. If the variance is immaterial, then no actions will be taken to adjust the code. However, if the variance is considered a material enough variance that it exceeds the thresholds that are hard coded, then the system will consider corrective actions to its own code.

Determined Corrective Action: The AI will run an analysis to determine if it has the data sufficient to make modifications to the Rules and Behaviors that would have resulted in a more accurate projection or output and simultaneously maintain or improve the outcomes of Variance Threshold calculations from previously determined projections and Final Deal Terms. Upon determining that there is enough data to determine whether the variance could have been reduced by having more updated data, altering the rules for matching similar borrowers, altering the rules for matching similar deals of similar borrowers, altering the rules for identifying likely lenders, altering the weightings of financial data, operating data, market data factors, and/or time that influence the projected deal terms, and/or altering the depth of history that is accessed. If there is a sufficient data to allow the system to properly determine whether one of the aforementioned modifications would be effective at reducing the variance, then the system will make a correction to its Rules and Behaviors for Handling Data.

Automatic Implementation of Corrective Measure & Validation: Once it has identified a Determined Corrective Action, the AI will then automatically adjust its Rules and Behaviors to make the case. Prior to the corrective action becoming active for live users, the system will re-calculate the variances for prior analysis for prior deals within a certain time frame, e.g., 2 years, and will only move forward with the Corrective Action if the recalculated variances on average are above a margin of error as may be set at that time. In general, the concept of the validation is to make sure that the system does not accidentally implement some new change that only increase the accuracy of a specific deal, but may in fact materially negatively impact the outcomes of all prior deals and therefore is likely materially negatively impact the outcomes of future deals. If the new action creates an impact that is inside the set margin of error, then the AI would automatically alter its Rules and Behaviors for Handling Data.

FIG. 1 is a block diagram of a computer server system 100 in accordance with embodiments that can implement any of the disclosed components herein. As shown in FIG. 1, computer server system 100 may include a bus 112 and/or other communication mechanism(s) configured to communicate information between the various components of computer server system 100, such as a processor 122 and a memory 114. In addition, a communication device 120 may enable connectivity between processor 122 and other devices by encoding data to be sent from processor 122 to another device over a network, such as internet/cloud 110, and decoding data received from another system over the network for processor 122.

For example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

In one embodiment, computer server system 100 includes processor 122 and other components communicating through internet/cloud 110, or any other communication medium, to a user device 124 such as a smartphone, tablet, etc. User device 124 can be any type of device that includes a touchscreen that enables interaction by a user using, e.g., a stylus or a finger. User device 124 may include device drivers that enable software applications to interface with hardware devices. In an example embodiment of a mobile device having a touch screen, the mobile device may include a device driver to recognize and translate user input gestures into commands or signals capable of being used by applications. An input device interface may interface with the touch screen device driver of the mobile device to receive user touch screen gestures. User device 124 also includes its own processor, memory, etc. In one embodiment, user device 124 implements a browser and communicates using Hypertext Markup Language ("HTML") to the remainder of system 100, which functions as a web server and provides web pages to user device 124 either directly or indirectly (i.e., through communication with one or more other web servers). In another embodiment, user device 124 communicates with server 130 that can also function as a web server and storage medium that provides data and/or web pages to user device 124.

Processor 122 may include one or more general or specific purpose processors to perform computation and control functions of system 100. Processor 122 may include a single integrated circuit, such as a microprocessing device, or may include multiple integrated circuit devices and/or circuit boards working in cooperation to accomplish the functions of processor 122. In addition, processor 122 may execute computer programs, such as an operating system 115, a data entry module 116, and application 118, stored within memory 114.

System 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system 100. The modules can include an operating system 115, data entry module 116 configured to provide data entry via a user interface, and all other functionality disclosed herein, as well as other additional functionality modules, such as application 118.

Memory 114, being non-transitory, may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

The web server portion of system 100 may further include a keyboard 126 and a cursor control device 128, such as a computer mouse, to enable a user to interface with system 100. System 100 further may include a database 117 coupled to bus 112 to provide centralized storage for data entry module 116 and application 118 and to store, for example, POS data as well as data for displaying the UI widget for date entry, customer data, etc. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, or any other database known in the art.

Although shown as a single system, the functionality of system 100 may be implemented as a distributed system. For example, memory 114 and processor 122 may be distributed across multiple different computers that collectively make up system 100. As previously disclosed, user device 124 is generally a mobile device that is remotely located from the remainder of system 100, which functions as a web server. Further, one or more components of system 100 may not be included. For example, for functionality as a user or consumer device, system 100 may be a smartphone or other wireless device that includes a processor, memory, and a display, does not include one or more of the other components shown in FIG. 1, and includes additional components not shown in FIG. 1, such as an antenna, transceiver, or any other suitable wireless device component.

Figure 2:
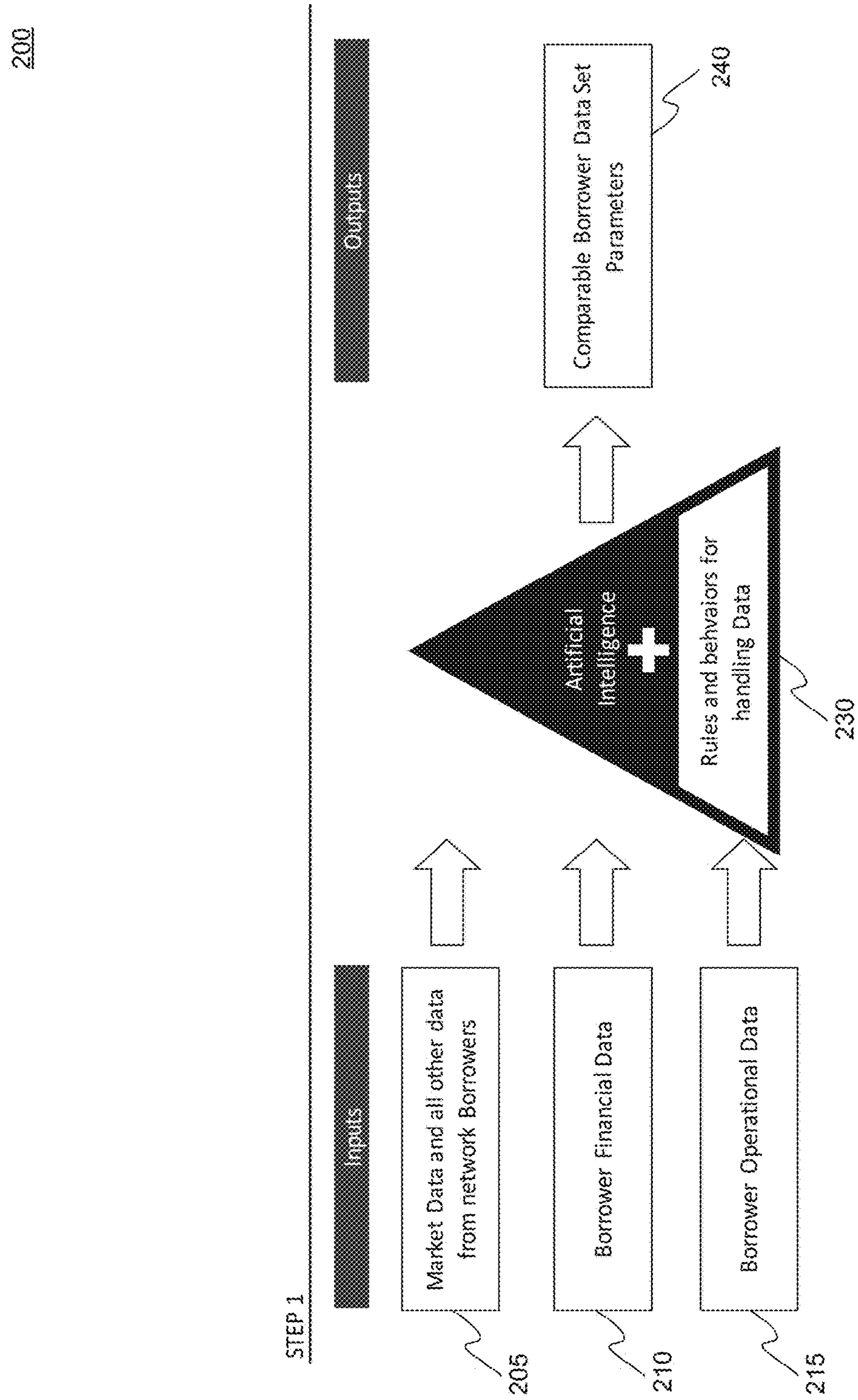
FIGS. 2-9 depict flow charts of methods for collecting data where the artificial intelligence generates output data, according to an embodiment of the present disclosure.

FIGS. 2-9 show exemplary embodiments of methods 200, 300, 400, 500, 600, 700, 800 and 900 for an autonomous marketplace system, according to multiple embodiments. FIG. 2 shows method 200 that represents step 1 that is directed to borrower data, according to an embodiment. Method 200 includes inputs 205, 210 and 215. Input 205 consists of market data and all other data from other borrowers on the network. Input 210 consists of a borrower's financial data and input 215 consists of a borrower's operational data. This step may include the inputting Input of financial statements including income statements, balance sheets, and cash flow statements, including statement forecasts. This may or may not happen by manual keying in of data or digital dragging and dropping of documents.

Input of operational and business data can include specifics about the industry, management, business model, market size, acquisition strategy, and other factors. Further, borrower financial data can also include the inputting of existing loan details including term, amortization, pricing, amount, covenants, collateral, and fees. This may or may not be required to be manually keyed into the system by the borrower or may involve dragging and dropping existing loan documents.

The collected borrower data act as the input to artificial intelligence system 230 that analyzes the borrower data to identify relationships between any of the data sets, identify comparable and similar data sets to a particular borrower. Artificial intelligence system 230 generates output 240 consisting of a set of comparable borrower data set parameters.

Figure 3:
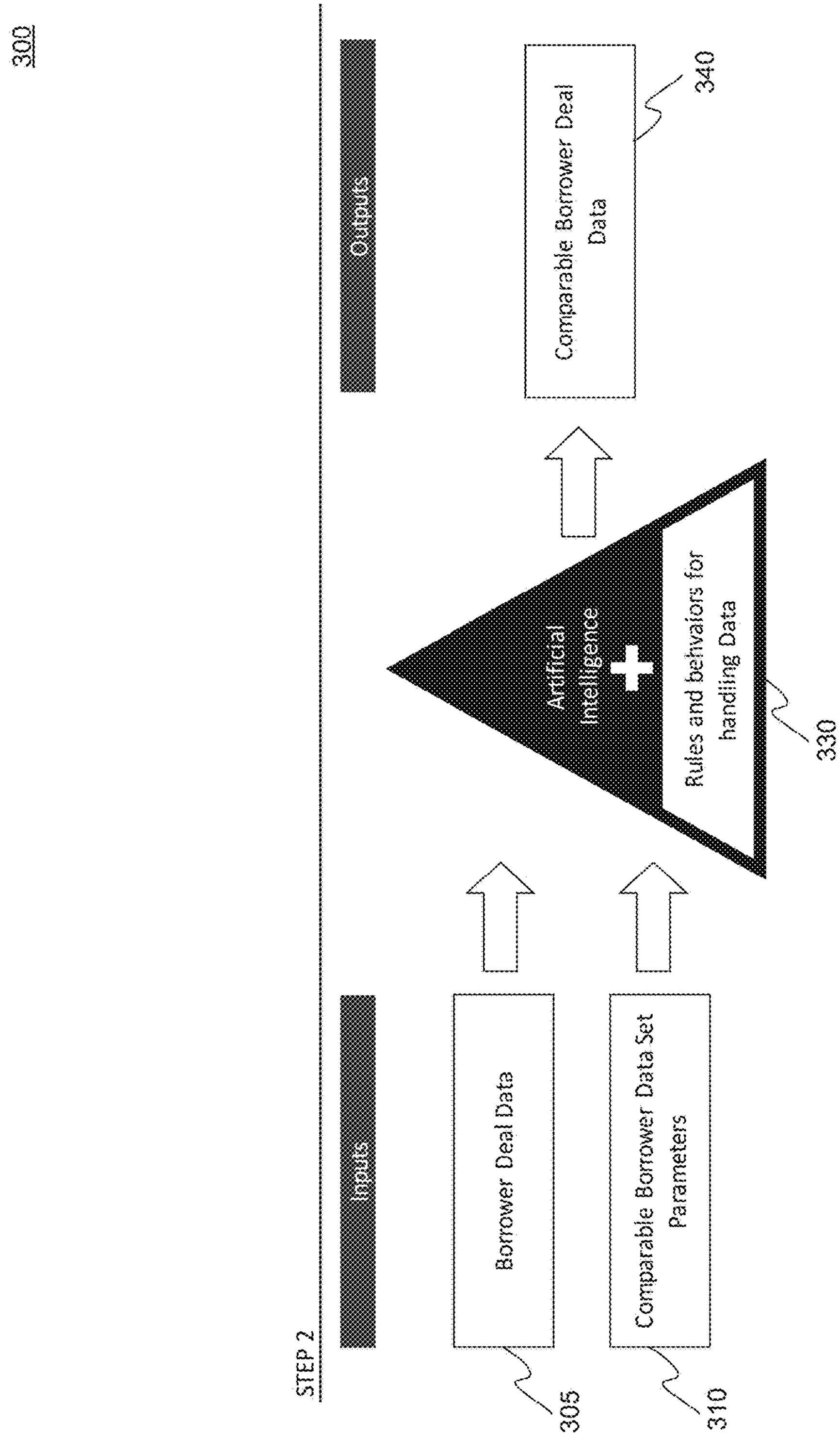

FIG. 3 shows method 300 that represents step 2 that is directed to deal data associated with the borrower, according to an embodiment. Input 305 consists of borrower deal data and includes information and data related to a credit facility of the borrower and can include information such as credit facility type, amortization, term, pricing, collateral, guaranty requirement, payment structure, covenants and origination date. Input 310 consists of comparable borrower data set parameters that are gathered and include groupings of certain companies based on the rules and behaviors of handling data. This information is analyzed by artificial intelligence system 330 to determine output 340 consisting of comparable borrower deal data where once the comparable borrowers are grouped the system groups the credit deals related to those common borrowers. Output 340 also includes weightings, e.g., level of similarity, for each data set.

Figure 4:
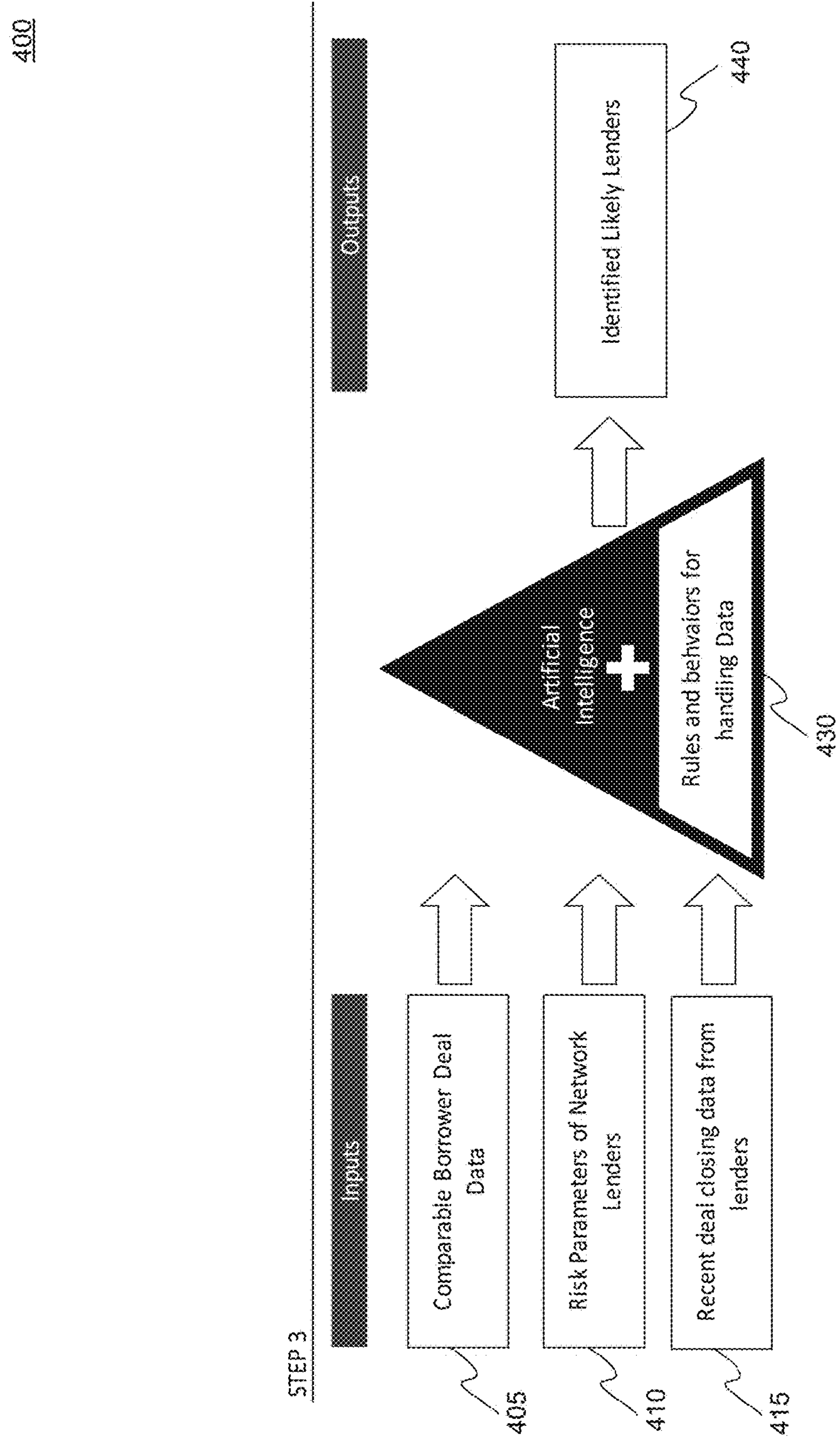

FIG. 4 shows method 400 that represents step 3 that is directed to data and information of interest to a potential lender, according to an embodiment. Method 400 includes inputs 405, 410 and 415. Input 405 consists of comparable borrower deal data and is equivalent to output 340, borrower deal data. Input 410 consists of risk parameters of network lenders and includes lenders that have profiles on the platform and are herein referred to as "network lenders." Network lenders input their acceptable or target risk parameters. These risk parameters serve as guidelines for the types of borrowers, deals and risk they are interest in bidding on. The risk parameters can include factors such as leverage levels, revenue size, EBIDTA size, ownership, geography, technology sector, and an array of financial and non-financial factors. Input 415 consists of recent deal closing data from lenders and includes closing data gathered by the system. The data can also be gathered by analyzing existing deal entered into the system from borrowers.

Artificial intelligence system 430 accepts the data from inputs 405, 410 and 415 to generate output 440 consisting of identified likely lenders. Output 440 includes lenders in the network that have historically produces deals like the proposed deal. Further, artificial intelligence system 430 will also include the current risk parameters of each particular lender and determine if the proposed deal falls within those parameters.

Data used by the lender concerning the borrower can include income statements, balance sheets, and cash flow statements, including statement forecasts. This may or may not happen by manual keying in of data or digital dragging and dropping of documents. Each lender has a target profile of the type of borrower that they wish to work with. Inputting of a borrower target profile may include data such as desired revenue ranges, cash flow ranges, balance sheet metrics, operational metrics, and several other factors. These factors may be pre-programmed into the system or may be created new by the lender. Upon newly created factors by the lender, those factors will be added to the data extraction process.

Figure 5:
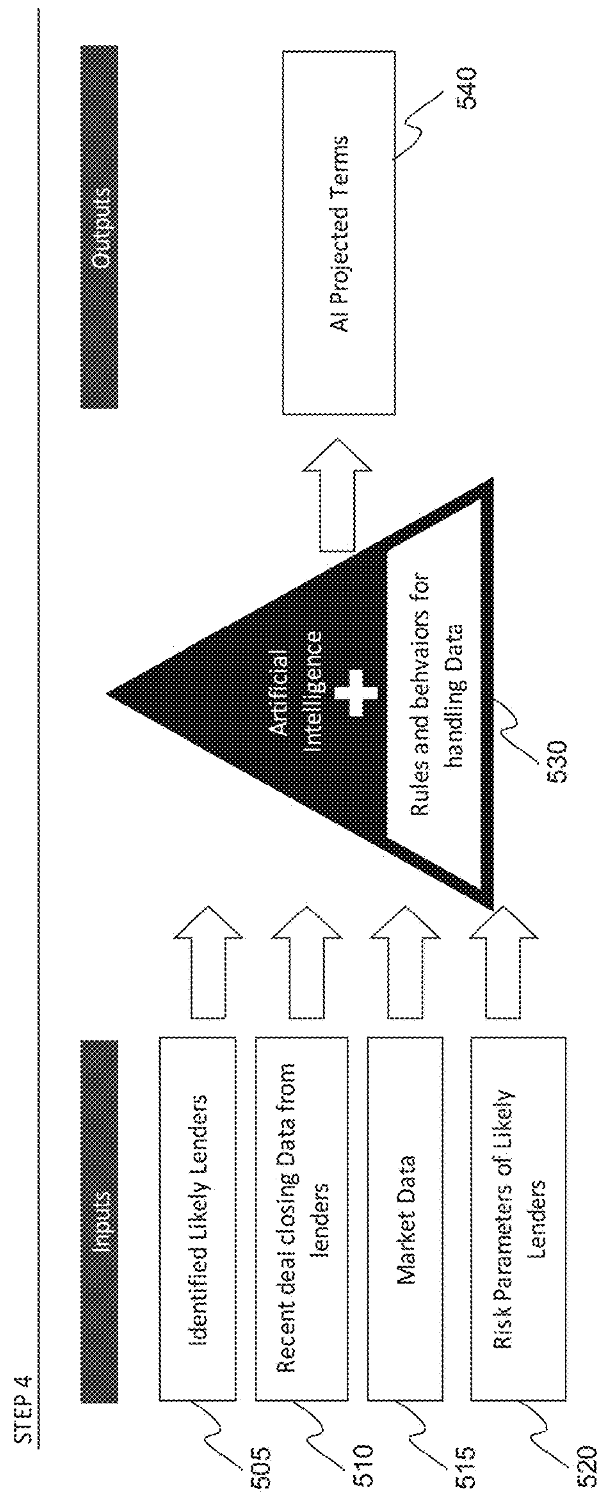

FIG. 5 shows method 500 that represents step 4 that is directed to collecting market data, risk parameters and lender and deal data and generate estimated terms, according to an embodiment. Method 500 includes inputs 505, 510, 515 and 520, artificial intelligence system 530 and output 540. Input 505 consists of identified likely lenders and is equivalent to output 540 discussed above. Input 510 consists of recent deal closing data from lenders and is equivalent to input 415 discussed above. Input 515 consists of market data. Market data can be any data that may come from lenders, banks, government agencies, online news sources, the Federal Reserve data publications and other sources. The data may include information and data metrics about loans closing in the market, lending behavior of banks, lending behavior of non-banks, various interbank borrowing interest rates, inflation, deflation, stock market performance, employment and payroll trends and other economic information. Input 520 consist of risk parameters of likely lenders. The risk parameters were discussed above but input 520 consists of those parameters of just the likely lenders identified in output 440.

Artificial intelligence system 530 accepts the data from inputs 505, 510, 515 and 520 to generate output 540 consisting artificial intelligence projected terms. The projected terms are derived from all the data in the system with artificial intelligence system 530 identifying, defining and measuring the relationship between market data, borrower risk, borrower financial data, borrower operational data and the risk parameters of lenders. Further, artificial intelligence system 530 will continue to measure how the relationship changes over time and implement modifications based on new relationships and correlation between the input factors.

The identification of likely lenders for a particular borrower includes where a prospective borrower, who has already inputted a minimum requirement of information as discussed above, can input specific factors for a deal request, e.g., a loan amount, facility type, pricing, amortization, collateral, covenants, etc. The deal request could be prompted by a need of the borrower, the maturity of existing loans, lender request to exit, or could be prompted by the information derived from the debt capacity visualizer discussed in FIG. 11, the terms tracker visualizer discussed in FIGS. 12A and 12B, and the historical trends visualizer discussed below.

Figure 15:
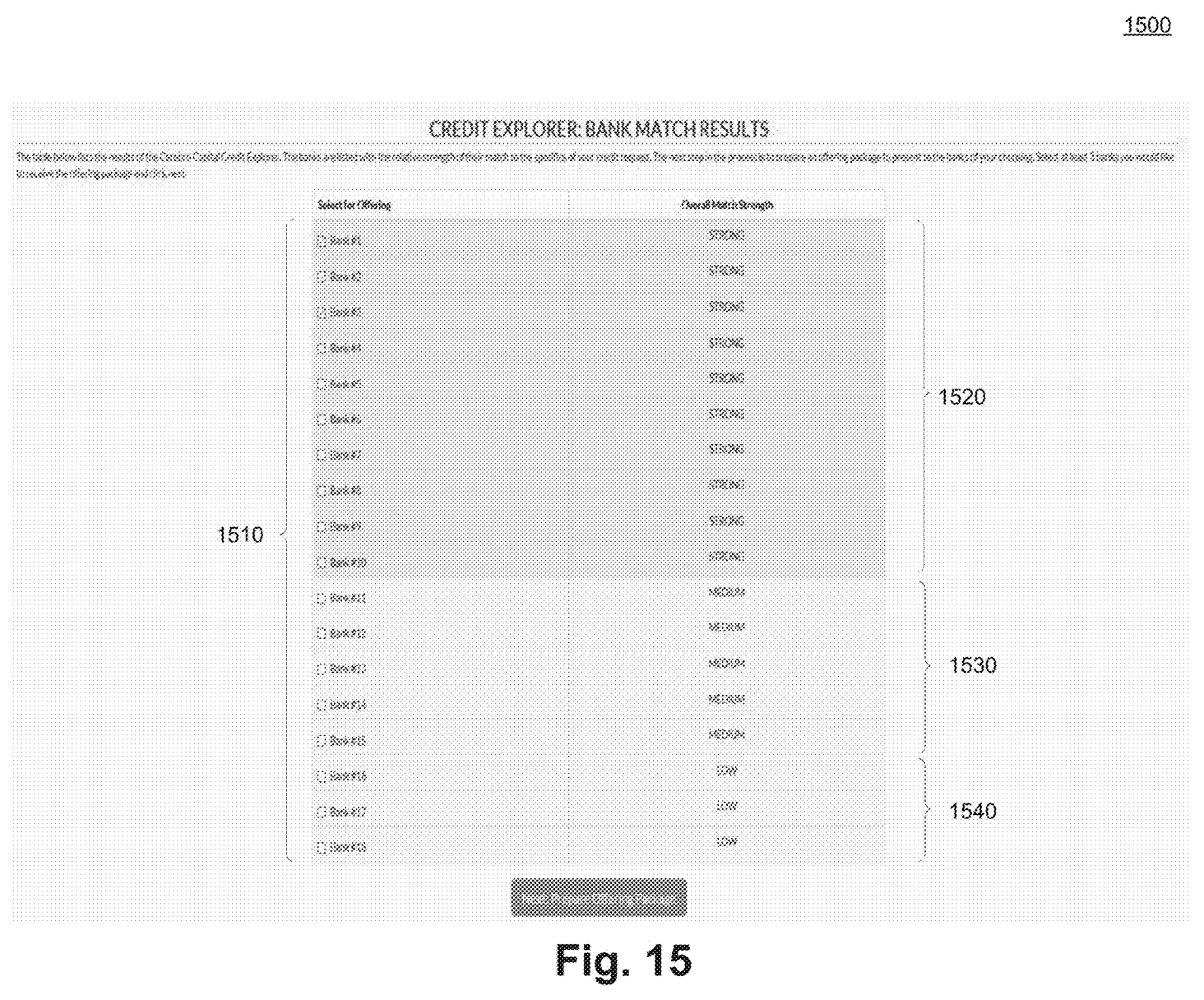

A prospective borrower can input lender preferences for a credit request, e.g., a lender geographic location, lender size, lender years of experience, lender area of expertise, and other factors. The system will identify lenders that are connected to the platform that have both borrower profile parameters and deal profile parameters that overlap with the request. During the matching process the lenders have not been contacted about this potential request. The matching is done entirely on the lender profile parameters as well as historical bidding behavior by each lender, e.g., if a lender failed to indicate that they could accommodate aircraft finance deals, but the platform had collected data indicating that the lender recently provided financing to aircraft deals, then they may be included as matching lenders in future aircraft finance deals. The matching lenders, if any, are listed for the borrower to select. However, instead of identifying the names of the lenders or lending institutions, they will be identified by rankings based on borrower preferences inputted as illustrated in FIG. 15. Once the borrower is informed of possible lenders, the borrower may then decide how many of the matching lenders they want to invite into the deal and will be able to select them. At this phase of the process, the lenders still do not know there is a prospective deal or that they have been identified as a possible match for a prospective deal and the borrower still does not know the identity of the lenders.

Figure 16B:
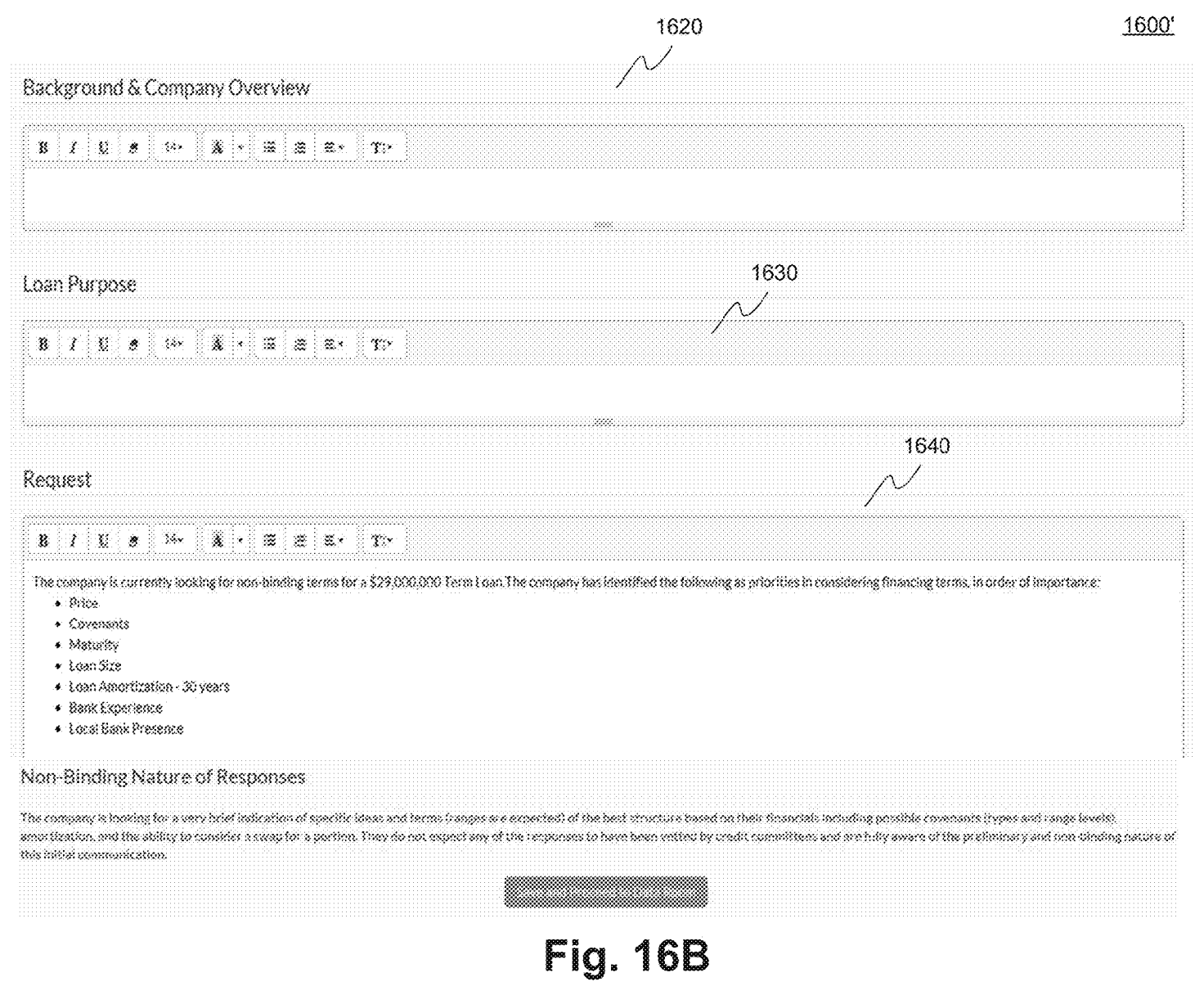

The borrower has the option to can write out the narrative of the requested financing through a guided template as discussed in FIGS. 16A and 16B. There may also be additional questions and metrics that need to be answered or inputted to reduce the response times of the lenders. The reason for delaying the questions and the written commentary for the deal until after the matching lenders have been selected is to make sure that there were matching lenders before proceeding to take the time to enter in the remaining factors. It is not anticipated that any additional factors would cause a matching lender to become a non-eligible lender. The borrower is able to access a data chat room where they can upload financials and other deal documents necessary for lenders to provide term sheets as discussed in FIGS. 17, 18 and 19. The data chat room includes the capabilities to allow lenders to communicate via text with the borrower. The data chat room also has the capability to setup lender group conference calls with the borrower management.

Upon entering the data chat room, the lenders will be revealed and the borrower can choose to block any of them from accessing the data chat room. Once the lenders have provided detailed indicative term sheets, the borrower will then select certain lenders, indicate that the process has concluded, and may shut out all non-selected lenders leaving the data chat room free to continue communicating and trading documents with the winning lenders and other deal participants such as related attorneys, etc.

Figure 6:
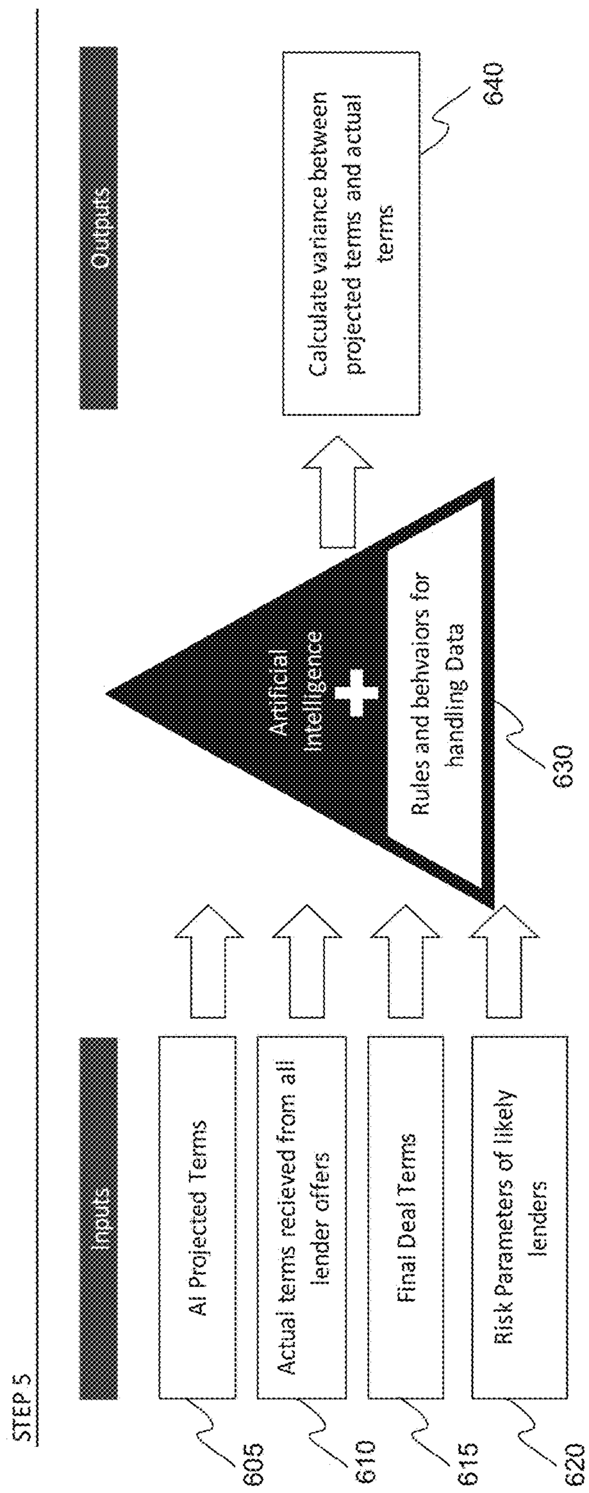

FIG. 6 shows method 600 that represents step 5 that is directed to determining a variance between projected terms and actuals, according to an embodiment. Method 600 includes inputs 605, 610, 615 and 620, artificial intelligence system 630 and output 640. Input 605 consists of artificial intelligence projected terms and is equivalent to output 540. Input 610 consists of the actual terms received from all of the lenders offers. The actual terms are the terms that lenders have sent in as bids to the borrower during a bidding process of a credit deal. This process is accomplished through the use of a data chat room that will be discussed later. Input 615 consists of final deal terms and will eventually become the "borrower deal data" assuming the loan eventually closes with the same terms as proposed by the lender. Input 620 consists of risk parameters of the likely lenders and is equivalent to input 520 discussed above.

Artificial intelligence system 630 accepts the data from inputs 605, 610, 615 and 620 to generate output 640 consisting calculated variances between the projected terms and the actual terms. Artificial intelligence system 630 reviews each of the deal terms of the final deal terms received from a loan originated on the system where a variance is calculated compared to the value for each term as projected by the system.

Figure 7:
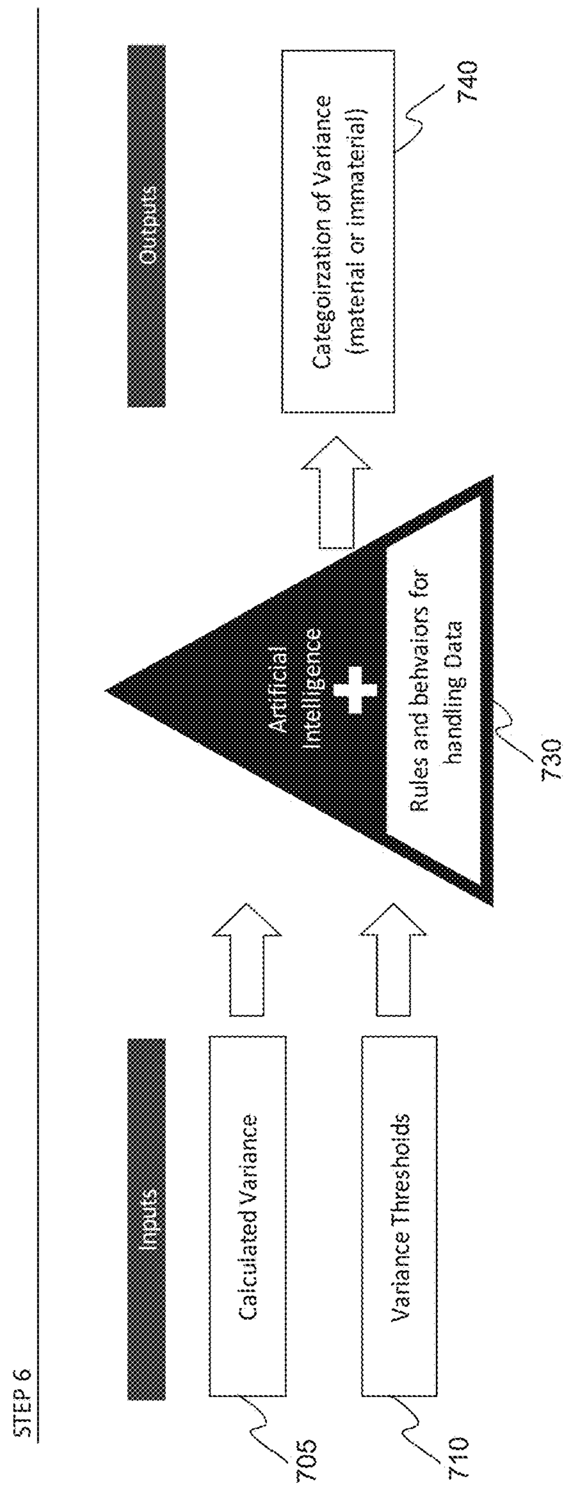

FIG. 7 shows method 700 that represents step 6 that is directed to categorizing the detected variances, according to an embodiment. Method 700 includes inputs 705 and 710, artificial intelligence system 730 and output 740. Input 705 consists of calculated variances and is equivalent to output 640. Input 710 consists of variance thresholds. Variance thresholds are established based the actual variance and the calculated variance. Artificial intelligence system 730 accepts the data from inputs 705 and 710 to generate output 740 consisting of categorization of the variances, whether or not the variance is material or not. When calculated input 705, variance, is determined in step 5, the system determines if the variance is material or immaterial based on input 710, the variance thresholds. If the variance is immaterial then no actions are taken to adjust the decision making in artificial intelligence system 730. However, if the variance is material where the variance exceeds the variance thresholds in input 710 then artificial intelligence system 730 modifies its decision criteria to reduce the variance.

Figure 8:
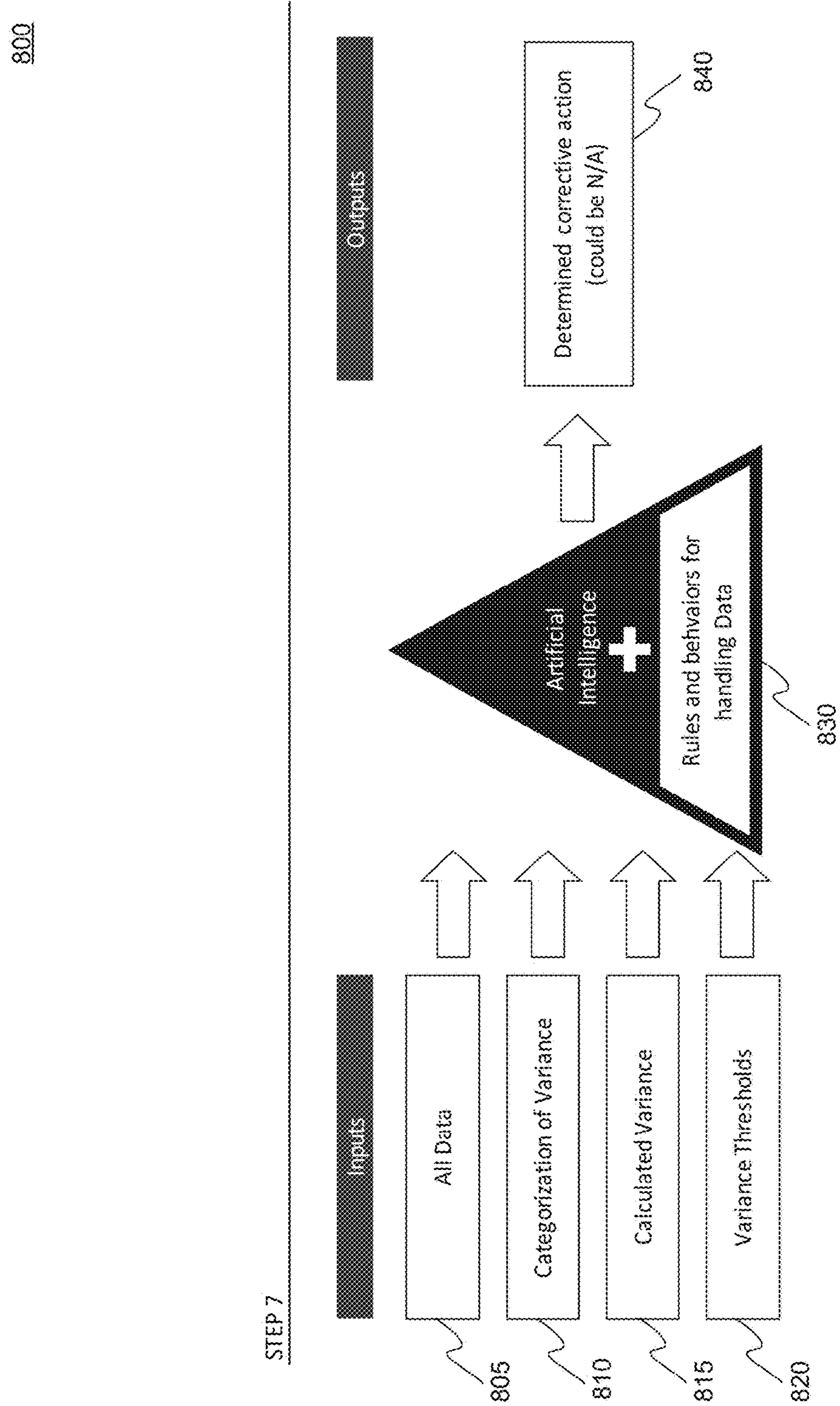

FIG. 8 shows method 800 that represents step 7 that is directed to determining a corrective action, according to an embodiment. Method 800 includes inputs 805, 810, 815 and 820, artificial intelligence system 830 and output 840. Input 805 consists of all the input data in steps 1 through 6. Input 810 consists of the categorization of variances and is equivalent to output 740. Input 815 consists of the calculated variances and is equivalent to output 640. Input 820 consists of the variance thresholds and is equivalent to input 710. Artificial intelligence system 830 accepts the data from inputs 805, 810, 815 and 820 to generate output 840 consisting of a determination whether one or more corrective actions if necessary. Artificial intelligence system 830 determines if it has sufficient data to make modifications to its rules and behaviors that would have resulted in a more accurate projection or output and simultaneously maintains or improve the outcomes of variance threshold calculations from previously determined projections and final deal terms.

Figure 9:
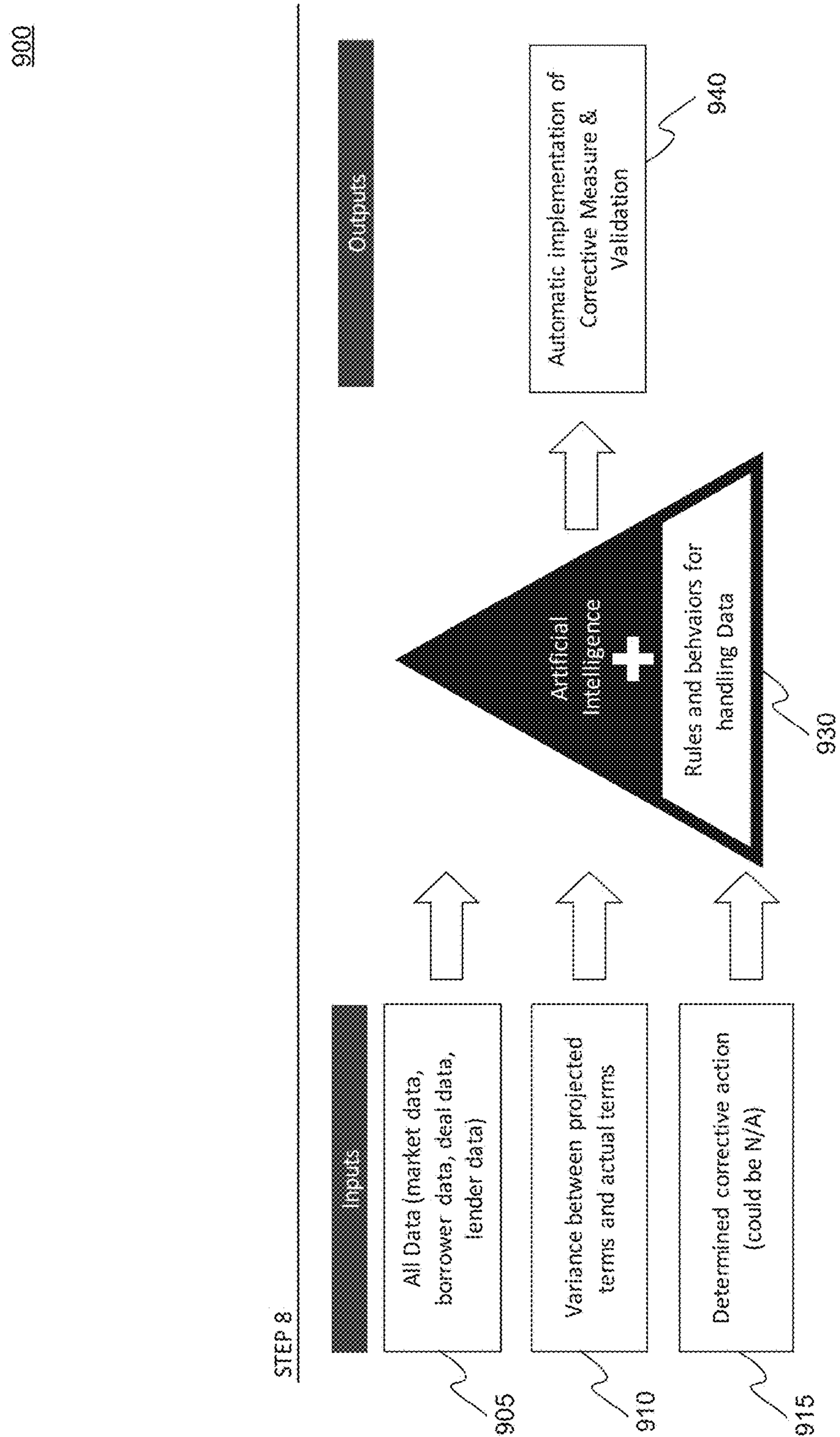

FIG. 9 shows method 900 that represents step 8 that is directed to implementing a corrective action if necessary, according to an embodiment. Method 900 includes inputs 905, 910 and 915, artificial intelligence system 930 and output 940. Input 905 consists of all the input data in steps 1 through 7, including market data, borrower data, deal data and lender data. Input 910 consists of the variances between the projected terms and the actual terms and is equivalent to output 640. Input 915 consists of the determination to produce a corrective action and is equivalent to output 840. Artificial intelligence system 930 accepts the data from inputs 905, 910 and 915 to generate output 940 consisting of an automatic implementation of a corrective measure and validation. Once artificial intelligence system 930 identifies a determined corrective action, it will then automatically adjust its rules and behaviors as a corrective action. Such corrective actions can include recalculating the variances for prior analysis of prior deals within a certain time frame. Artificial intelligence system 930 also performs a validation to ensure that the system does not accidentally implement a new change that only increases the accuracy of a specific deal, but produces an overall negative input of all prior deals and therefore would likely materially negatively impact the outcomes of future deals.

Figure 10:
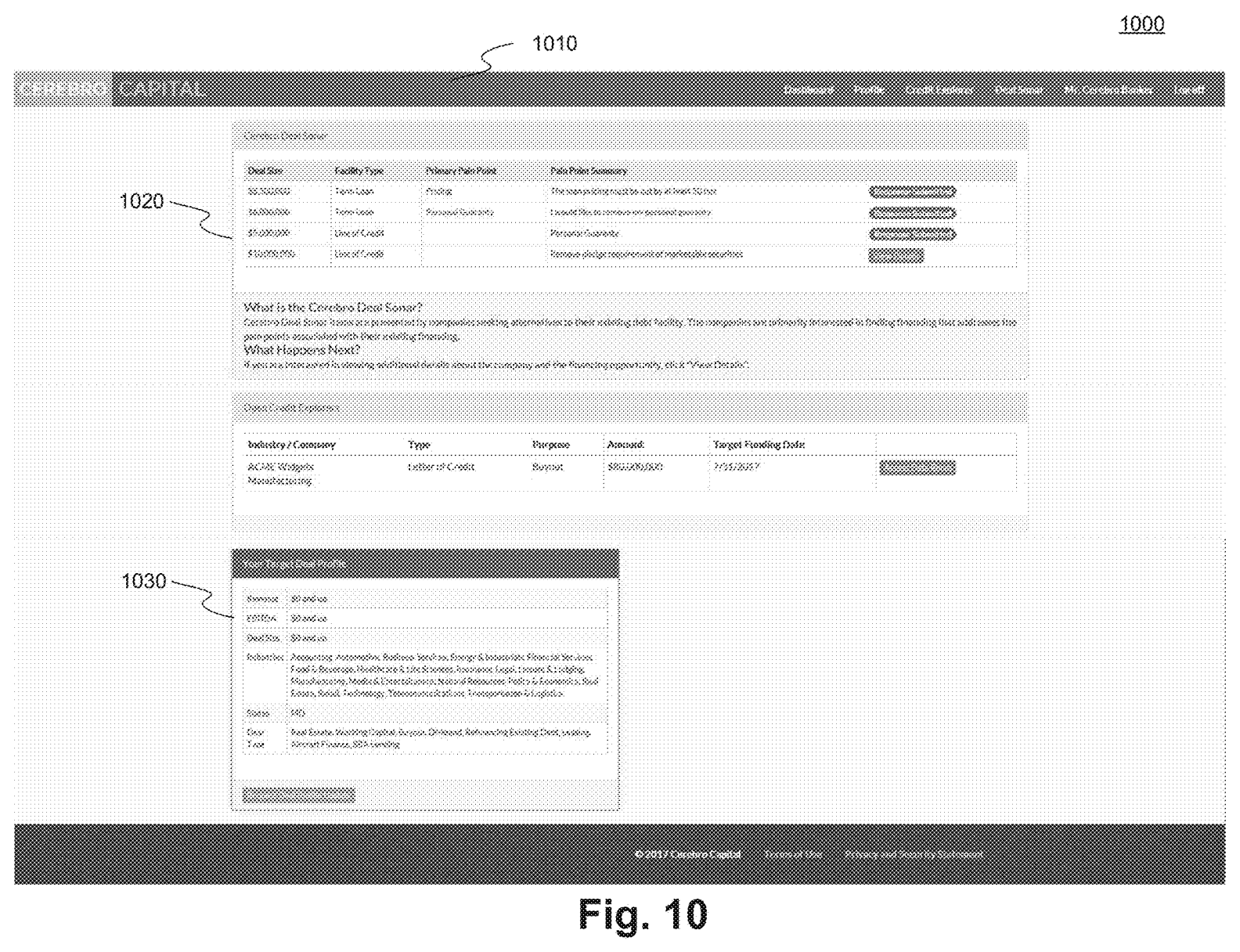

FIG. 10 is an illustration of lender dashboard 1000, according to an embodiment. Lender screenshot 1010 represents a possible view of what lenders may see when they log into the system and includes deal sonar 1020 and a target deal profile 1030. Deal sonar 1020 presents items presented by companies seeking alternatives to their existing debt facility. Target deal profile 1030 is where the specific ranges and specifications of the lender risk parameters are posted and inputted for a particular lender. By clicking on the light blue button "Request Deal Profile Update" a lender can modify their existing profile and could add a new filter that is pre-programmed, e.g., such as EBITDA ranges or another financial metric, or could add a brand new unique filter that is completely unique, e.g., a lender could decide that searching for credit deals with borrowers that have had their CFO in place for over 5 years is an important risk metric for them and could add this to the profile and the AI may choose to add that question to the data capture process for borrowers requesting deals on the system.

Figure 11:
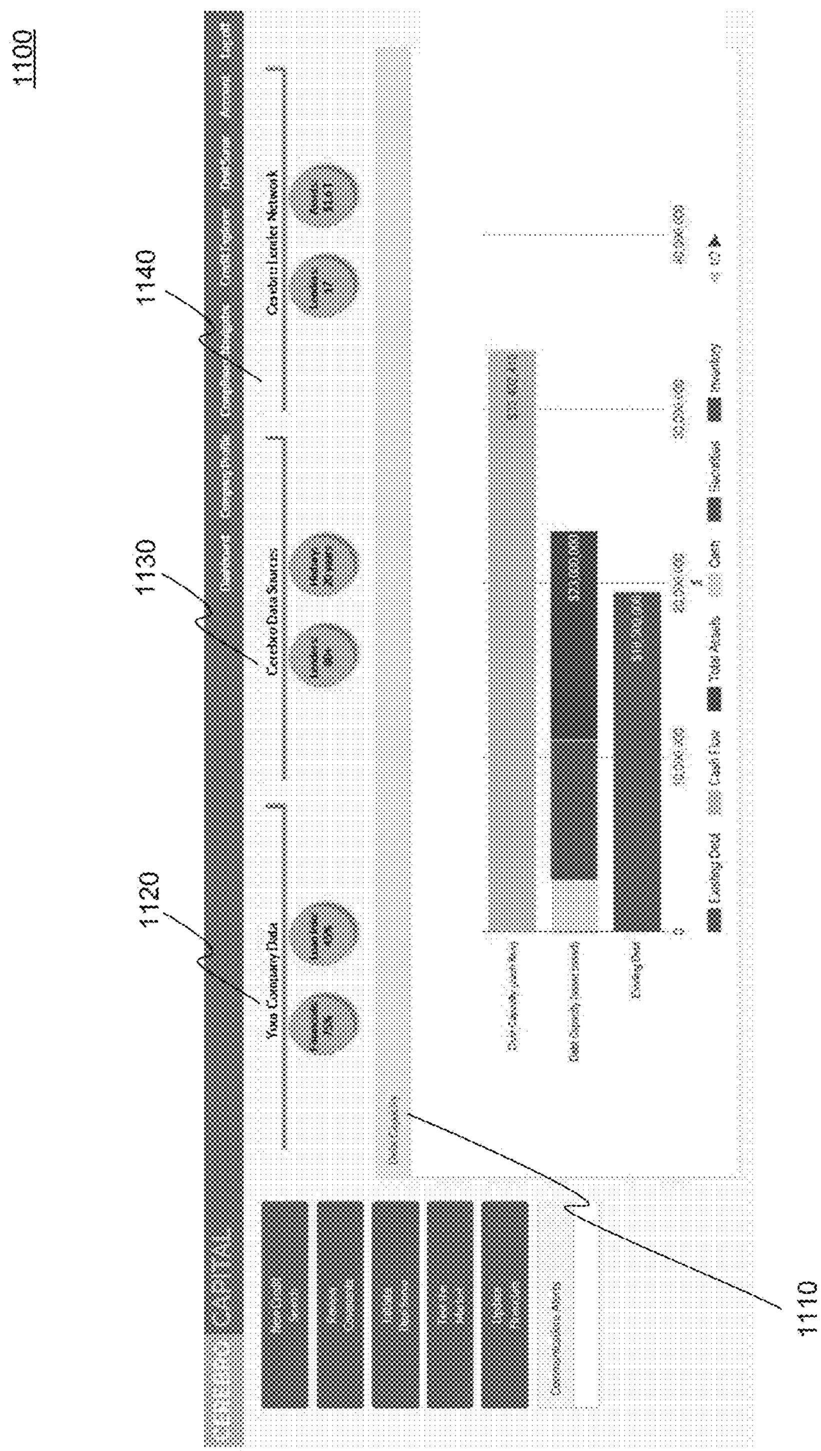
FIG. 11 illustrates an image of a dashboard view showing a debt capacity visualizer, according to an embodiment of the present disclosure.

FIG. 11 is an illustration of debt capacity view 1100, according to an embodiment. Debt capacity view 1100 includes the debt capacity 1110 of a borrower, company data 1120, data sources 1130 and a lender network 1140. The AI is basing debt capacity 1110 off the borrower's inputted financials as well as the risk parameters of network lenders, the historical deal data, and other data as the AI may determine. Weightings are used to increase or dampen the impact of comparable borrowers and credit deals based on time, similarity, and market data. For example, the AI uses weightings to increase or decrease the impact of comparable data that relates to a borrower depending on its level of financial data and operational data similarities. All of this is done to provide an accurate view of the debt capacity 1110 of the borrower from a cash flow basis and an asset based lending basis in real time.

The present invention will provide both borrowers and lenders visualizations of debt and lending capacity based on the System's generated analysis of the data collected from the borrowers and lenders, the behaviors of borrowers and lenders, the data derived from deals and external market data. The borrowers will need to input certain metrics about their business, operations, and two recent years of financials. The lenders will need to input criteria detailing the types of companies and types of loans that they are able to finance. The system will collect terms from deals of borrowers with similar metrics. Those terms will be collected from existing deals that the borrower has entered onto the system, deals that the borrower has won from lenders on the system, proposals offered by lenders on the system for requested deals, and lender criteria.

The system derives likely terms based on its collection of data and will populate charts, graphs, and visualizations showing what the borrower is likely to receive if they went into the market depending on specified loan parameters, for example loans based on cash flows or loans based on assets. The system will also compare the potential loan capacity to the amount of existing debt the borrower currently has. The credit capacity visualization will fluctuate as the deal data changes as well as when the borrower business, operations, and financial data are updated.

Figure 12A:
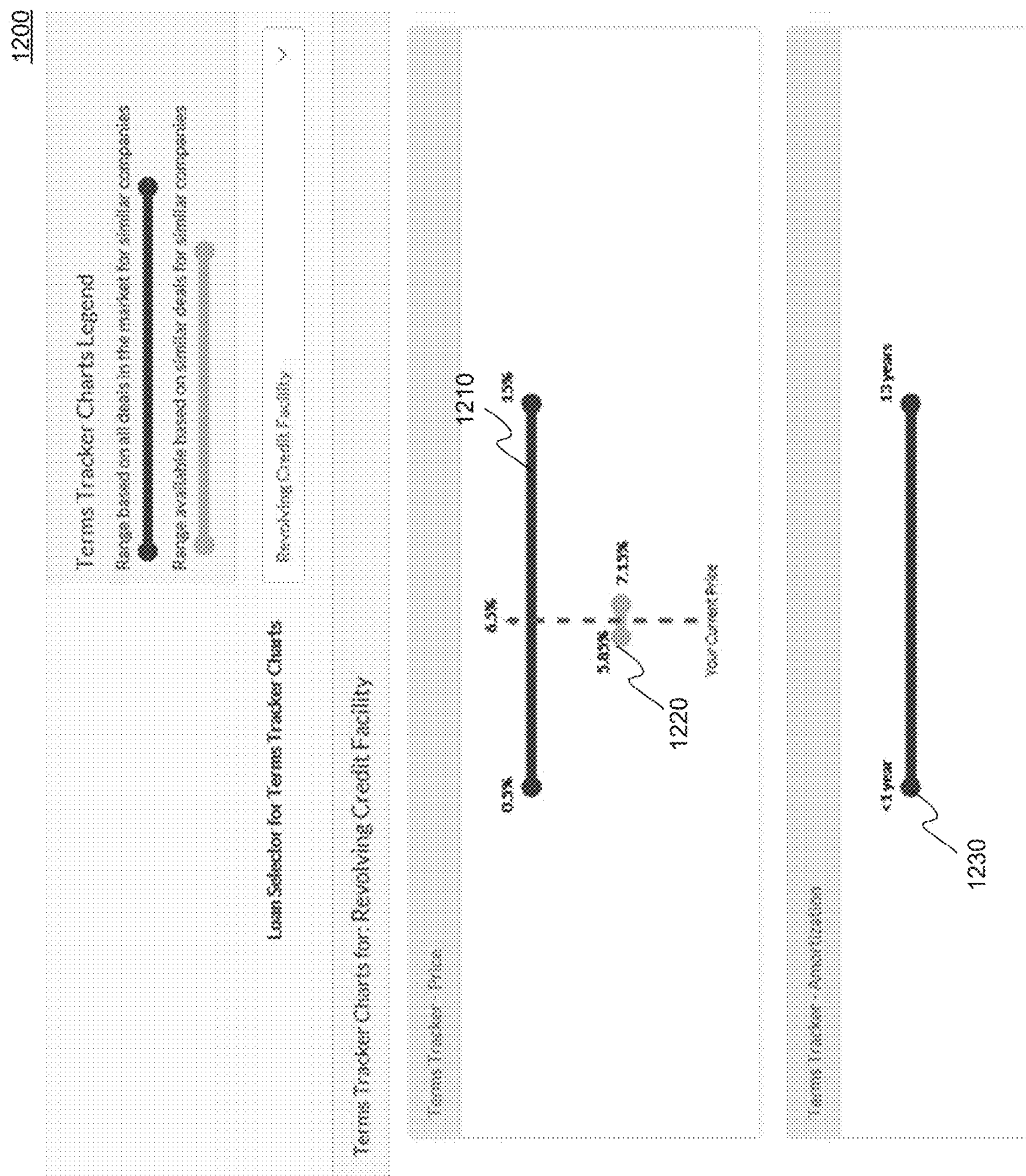
FIGS. 12A and 12B illustrate an image of a dashboard view showing a terms tracker visualizer, according to an embodiment of the present disclosure.
Figure 12B:
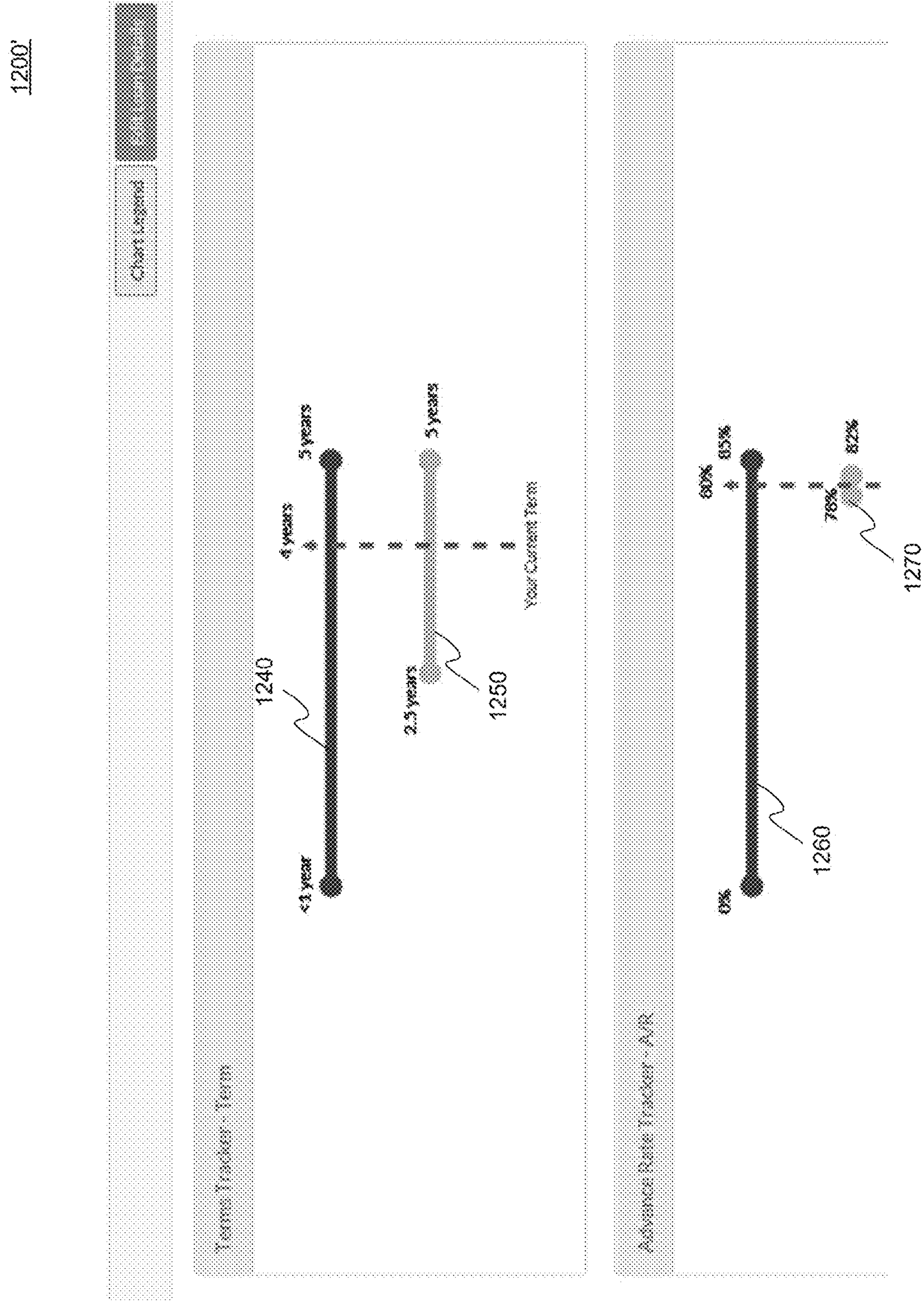

FIGS. 12A and 12B are an illustration of terms tracker visualization 1200 and 1200', according to an embodiment. Terms tracker visualization 1200 includes similar company price range 1210, similar company amortization range 1230 and similar deal price range 1220. Terms tracker visualization 1200' includes similar company term range 1240, similar company accounts receivable rate range 1260, similar deal term range 1250 and similar deal accounts receivable rate range 1270.

The present invention provides both borrowers and lenders visualizations of lending terms and market data based on system selected comparable deals, which the system would have identified from deal information collected from the borrowers and lenders. Additionally, the system takes into account the lender risk parameters and any external market data that the system has determined is comparable data to the borrower. The borrower inputs certain metrics about their business, operations, and recent years of financials. Additionally, the borrower inputs specific and granular details regarding existing loan facilities. Lenders input criteria detailing the types of companies and types of loans that they are able to finance. The system collects terms from deals of borrowers who the system has determined are similar borrowers with similar deals.

The terms tracker visualization shown in FIGS. 12A and 12B provide a graphical representation for each term of the borrower's loans for a specific loan facility showing whether it is better or worse relative to a similar term in a similar and recent deal for a similar borrower. The visualization also shows the extreme ends of the market for that term for a similar borrower, though not necessarily a similar deal.

For example, a commonly negotiated term is the amortization of a loan. A borrower may have a term loan secured with business assets with a 5-year amortization; however, other similar borrowers with recently placed term loans secured with business assets may show 7-year amortization. This would indicate that the borrower may be able to achieve 7-year amortization if they refinance. Furthermore, the graphic may also show that non-similar, recently placed deals for similar companies are closing 30-year amortization loans. In this case, those loans may be real estate backed facilities that have a much higher market amortization. This data can be very helpful and important for borrowers as they understand the possibilities of what's out in the marketplace.

The system can also provide both borrowers and lenders visualizations of historical lending terms and market trend data based on comparable deal data that the system determines through artificial intelligence as similar and comparable to the borrower. The data analyzed is collected from the borrowers and lenders and based on data derived from deals and external market data. The borrowers will need to input certain metrics about their existing loan facilities. Commercial lenders will need to provide data about certain loan terms for commercial borrowers, such as pricing, amortization, collateral requirements, loan amount, etc. The system will then produce a series of visualizations in the form of charts and graphs that show the historical trends for each of those loan terms for similar borrowers, to the extent similar borrowers can be derived, and will indicate where on the chart the borrower closed on their existing financing. Thereby showing the borrower how the market performed leading up to their deal closing as well as how the market is doing today. This information could help borrowers make more informed decisions on the timing of their refinancing or new financing transactions.

FIG. 13 is an illustration of borrower credit explorer screen view 1300, according to an embodiment. Borrower credit explorer screen view 1300 includes data metrics 1310, preferences 1320 and communication section 1330. Borrower credit explorer screen view 1300 illustrates an example of the data metrics and preferences the system may capture at the beginning of the data room process. Several other pages of questions may be created. Over time, the AI will be able to add questions to this data capture module based on the network lender risk parameters. As the lenders enter custom risk parameters, the AI may choose to include questions to help identify risks that the lenders are looking to attract or avoid.

FIG. 14 is an illustration of credit explorer screen 1400, according to an embodiment. Credit explorer screen 1400 provides a summary view of deals that are being bid out to the credit markets. Credit explorer screen 1400 includes columns 1410 of prospective deals and detail for rows 1430 of multiple proposed deals. Credit explorer screen 1400 also includes shortcuts 1420 to direct a user to other areas such as the data room. After the deal is closed, the data rooms can remain open to the borrower but closed to the lenders. This will serve as a way to archive deal related documents and communications.

FIG. 15 is an illustration of a bank match screen 1500, according to an embodiment. Bank match screen 1500 includes a ranked set of lenders 1510 and classified as strong 1520, medium 1530 and low 1540. Lenders 1510 are shown anonymously. As such, the lenders are not yet aware that the borrower is looking for a loan. However, the AI has reviewed the borrower's financials, determined the borrower risk category, determined the requested credit facility's risk category, and has identified likely lenders based on their risk parameters and their recent deal history of loans that they have bid on and loans they have won/closed with other similar borrowers. Based on all of this data, the AI has determined a ranked list of possible lenders that are likely to be able to satisfy the loan without the lenders even knowing there is a request potentially coming. It is possible that no lender may be likely to fulfill the borrower's request, in which case, the borrower would be able to avoid the risks involved in revealing their sensitive financial information and other information to lenders unnecessarily.

FIGS. 16A and 16B are an illustration of a guided credit proposal template 1600 and 1600', according to an embodiment. Guided credit proposal template 1600 includes an offering package section 1610. Guided credit proposal template 1600' includes a background and company overview section 1620, a loan purpose section 1630 and a request section 1640. The borrower can fill in information about their credit request and the system will generate a professionally formatted presentation. Additionally, there is an automatically generated cover letter with key information about the deal filled in. This is important because often borrowers so infrequently access the financial markets that they are unaware of the protocols involved in securing a loan from a lender. As a result, a lot of time is wasted as the borrowers educate themselves on the process.

Figure 17:
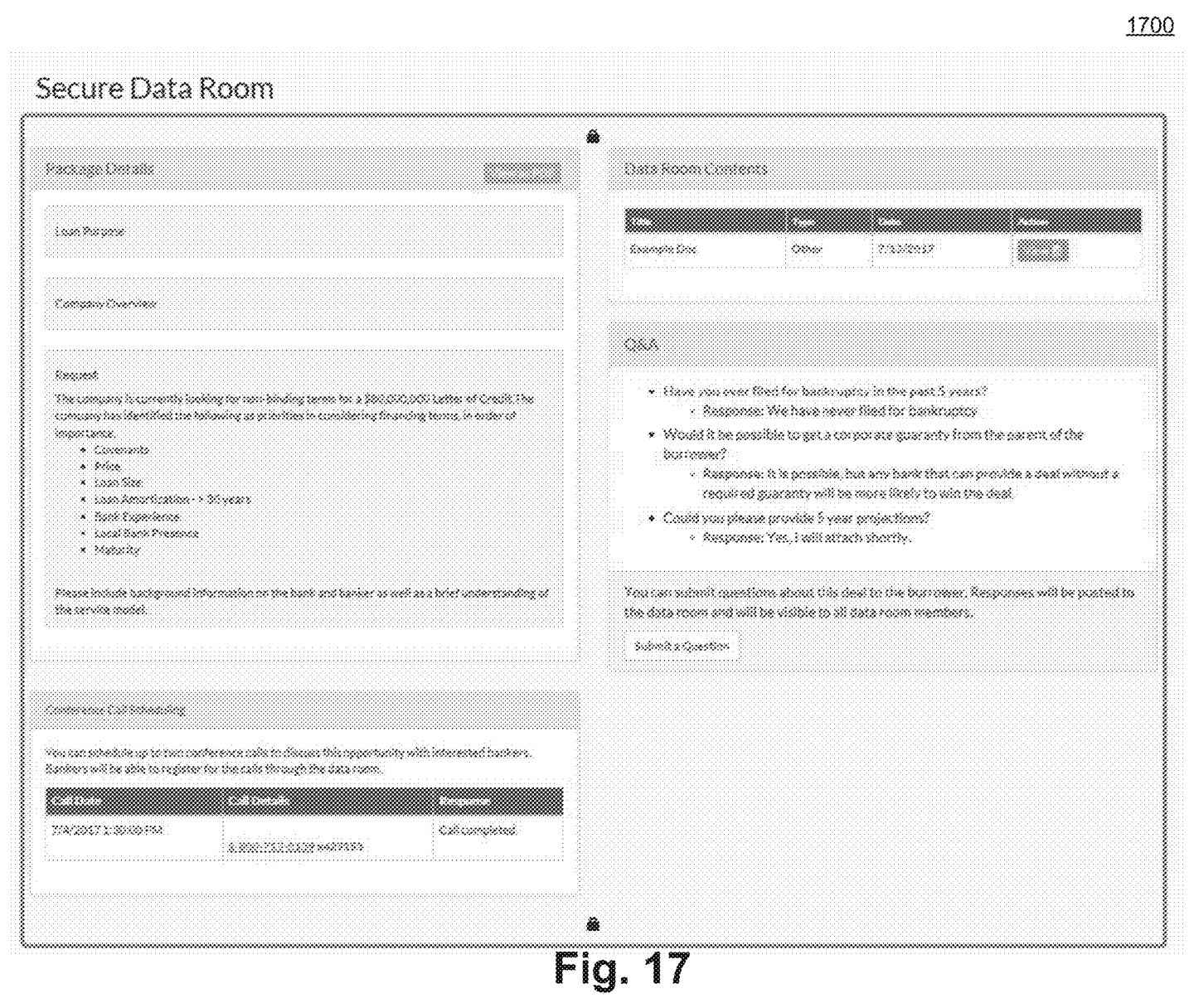

FIG. 17 is an illustration of a secure data room 1700, according to an embodiment. Secure data room 1700 is also referred to as a secure data chat room. Secure data room 1700 illustrates some examples of conference call information and question and answer activity.

Figure 18:
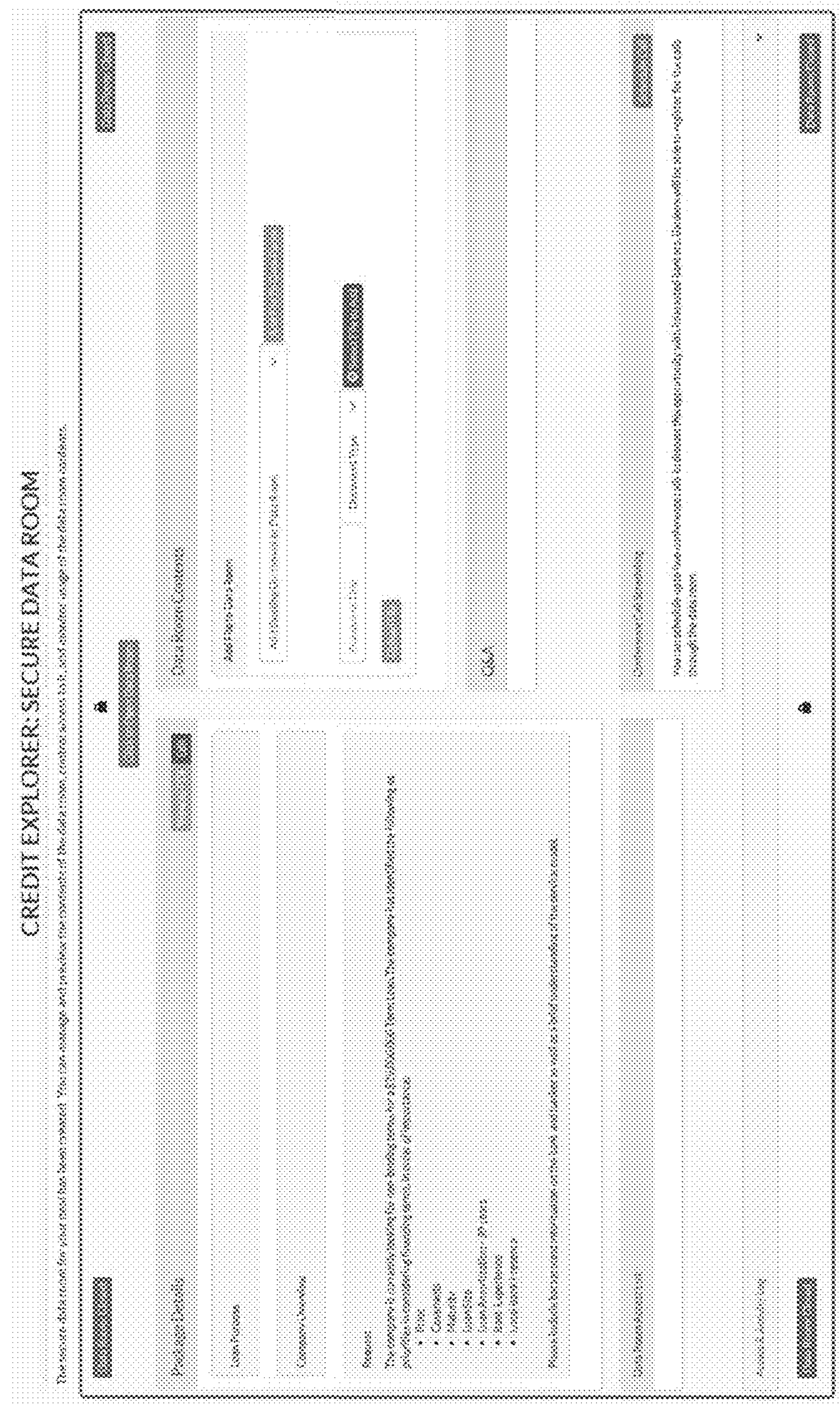
FIG. 18 illustrates an image in a secure data chat room of a secure communications area, according to an embodiment of the present disclosure.

FIG. 18 is an illustration of a credit explorer secure data room 1800, according to an embodiment. Credit explorer secure data room 1800 illustrates where the borrower can post financial and operational information. Credit explorer secure data room 1800 is also where the automatic proposal generator will generate a proposal document. The credit explorer secure data room 1800 also allows the borrower to setup conference calls for phone communications between the borrower and lenders. Questions outside of the conference calls can be typed in by the lenders in the Q&A module, which increases efficiencies because any questions the borrower chooses to answer will be visible to all lenders, thereby reducing the number of times similar questions need to be answered. Additionally, all documents downloaded by lenders will be watermarked with their names and contact information as a form of security. All activity within credit explorer secure data room 1800 is tracked and logged for the Borrower's records.

Credit explorer secure data room 1800 is also where the borrower will access term sheets from the lenders, but the lenders will not be able to view the term sheets submitted from other lenders. Term sheets can be submitted via PDF or Word Documents or they could be submitted through a term sheet digital form.

Figure 19:
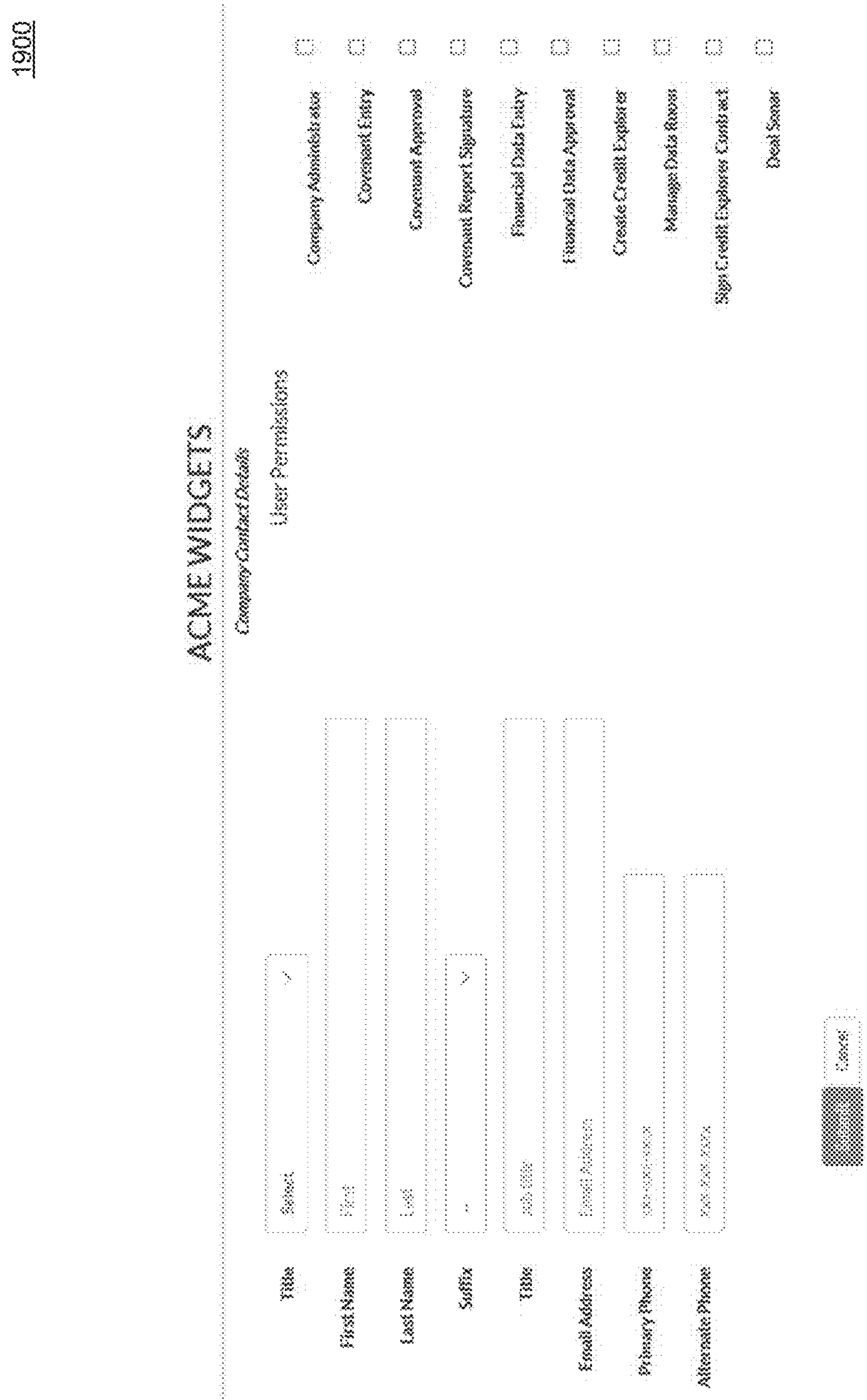
FIG. 19 illustrates an image where user permission levels are assigned, according to an embodiment of the present disclosure.

FIG. 19 is an illustration of a permission status screen 1900, according to an embodiment. Here, the view shows the types of permissions that certain users can be assigned. Not all users on the system will have the same level of authority or permissions.

Figure 20A:
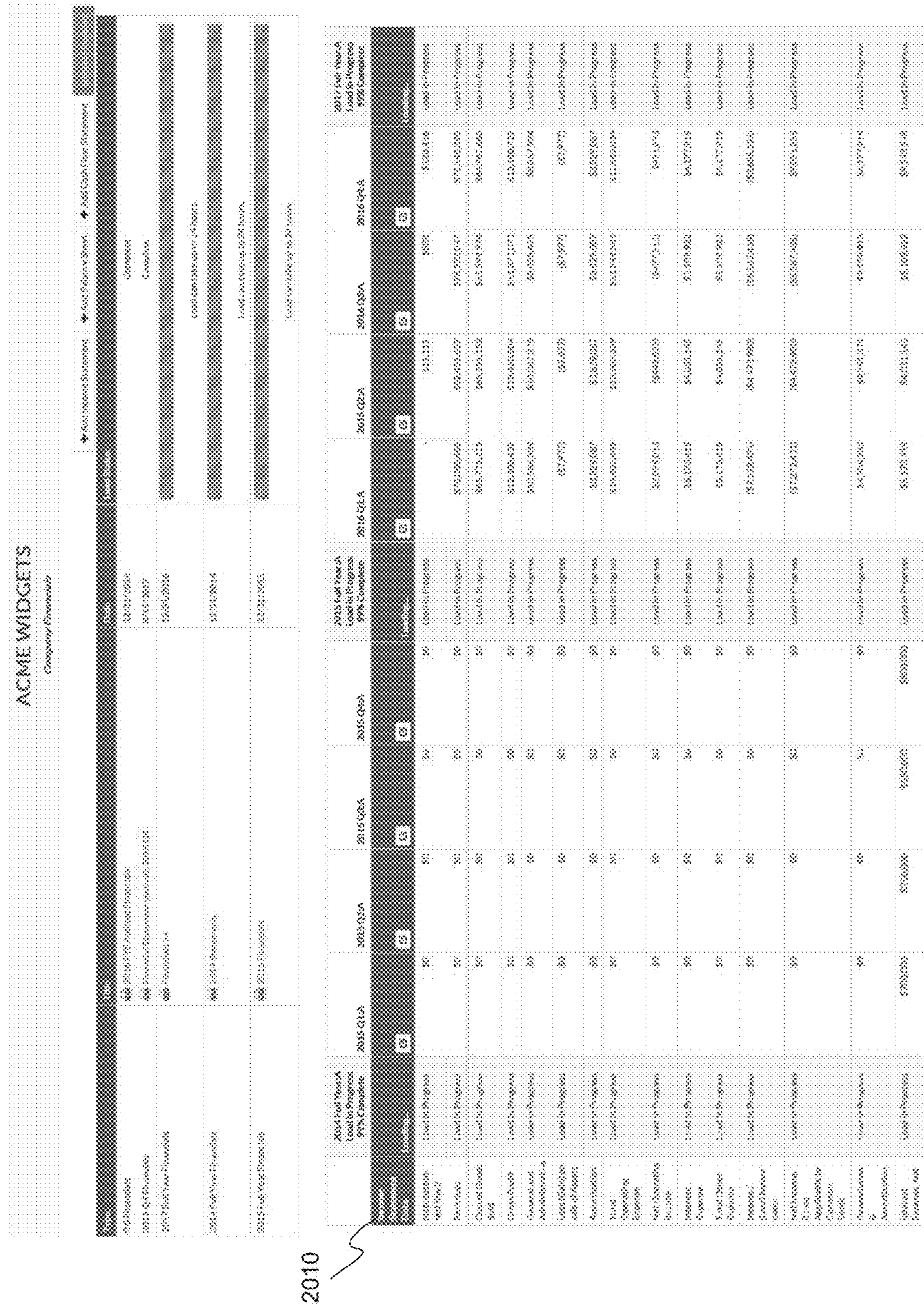
FIGS. 20A and 20B illustrate an image of a view showing a financial data collection area, according to an embodiment of the present disclosure.
Figure 20B:
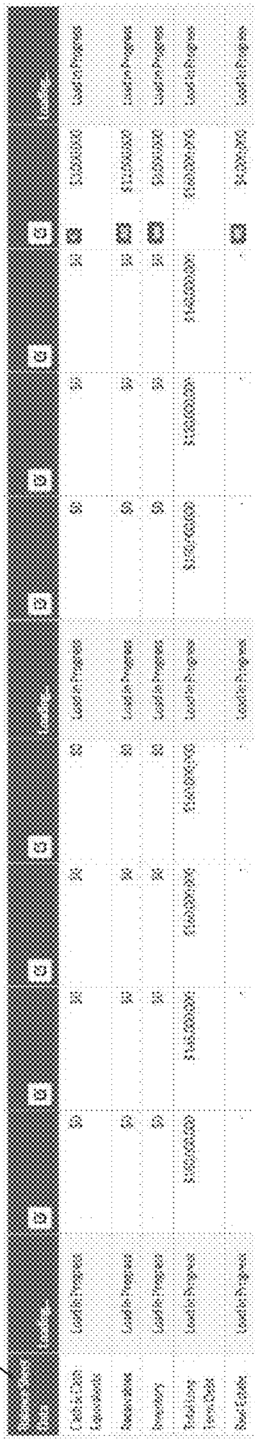

FIGS. 20A and 20B are an illustration of a financial status screen 2000 and 2000', according to an embodiment. Financial status screen 2000 includes income statement data 2010. Financial status screen 2000' includes balance sheet data 2020. Borrowers can either drag and drop their financials in any format or they can manually type in each of the line items. The system digitizes the numbers and line items and the AI interprets the data and determines the risk categorization of the borrower as well as determining which data sets represent similar borrowers. This information is used to populate the debt capacity visualization, the terms tracker, and likely lender identification, etc.

FIG. 21 is an illustration of a financial editing screen 2100, according to an embodiment. Here, financial editing screen 2100 allows a user to manually edit or enter financial information.

FIG. 22 is an illustration of a term sheet input screen 2200, according to an embodiment. Here, lenders input their term sheet information and receive an indication from the AI whether their term is competitive with the other terms clearing in the market place for similar deals of similar borrowers. The AI can also predict what the other lenders are likely to bid based on their previous bidding history and will include that prediction, under a certain weighting, which will be indicative as to the relevance to this particular deal and borrower, as the AI may determine, as part of the data set that the AI is using to indicate whether the typed in term is green, yellow, or red. The color indicators will let the lender know if their term is better than market, the same as market, or below market for the specific borrower and a credit deal. This allows the lender to adjust their terms before submitting the term sheet, if they choose, and gives the lender an understanding of whether they are likely to win or lose the deal and why, before they even submit their term sheet. The AI will collect data on the original terms and on the modified terms that the lender may input after receiving feedback. This will help the AI make better and more accurate predictions as term sheets are submitted over time.

In an embodiment, the present invention can be implemented on a non-transitory computer-readable medium having instructions stored thereon that, when executed by a processor, cause the processor to dynamically extract and autonomously match one or more prospective lenders and a borrower. In such an embodiment the functionality can be described as a set of interconnected software systems described as follows.

An artificial intelligent decision generator that is capable of:

searching and analyzing borrower financial statements for specific line items and trends from previous periods;

searching and analyzing borrower debt originations for specific terms, documentation, and other loan characteristics such as compliance requirements and lender;

searching and analyzing macro-economic trends and regional economic trends, searching and analyzing credit market trends;

pairing its financial analysis with analysis in previous steps to produce a data point of credit facility terms that may be compared to other credit facilities originated in that period or other periods;

identifying other comparable borrowers and comparable deals based on the analysis of previous steps;

searching and analyzing credit facility requests and proposed lender bids for those requests;

predicting loan terms for certain borrowers based on analysis from the previous step for comparable borrowers;

applying dynamic weighting to decision metrics or add additional data metrics to compensate for imperfect comparable credit facility data, which may arise due to the passage of time, sudden market shifts, sudden internal performance, or any other factor;

collecting and analyzing failed credit facility request data to determine segments of market demand that have insufficient lender supply;

collecting and analyzing lender information and track lender behavior to determine and provide to the lender a review of their competitive weaknesses and competitive strengths;

analyzing lender offers, borrower selected offers, and newly inputted existing deals that may be entered into the system, for the purposes of comparing all of those data points to the predicted deal terms and deal term ranges; and modifying data collection requirements based on exceeding a certain margin of error and modifying data collection requirements based on new risk parameters created by lenders within the system, including new risk parameters identified by the system, through the system's own analysis.

A financial data capture system that is capable of:

guiding the borrower through a process to input financial statements;

allowing statements in pdf, excel, or any other format to be loaded by dragging and dropping;

comparing period over period results, growth rates, and large variances;

interfacing with other modules and systems contained within the platform;

including dependencies and sequencing of tasks; and utilizing machine learning such that future statements can be entered in more quickly and with fewer errors.

An existing loan data capture system that is capable of:

guiding the borrower through a process to input loan facility information including term, amortization, financial covenants, non-financial covenants, maturity dates, fees, and other provisions;

allowing loan agreements in pdf, word, or any other format to be stored and or digitized by dragging and dropping;

including dependencies and sequencing of tasks; and utilizing machine learning such that future additional loan facilities can be entered in more quickly and with fewer errors.

A deal request system that is capable of:

guiding the prospective borrower through a process to input their specifications of a loan request including term, amortization, financial covenants, non-financial covenants, maturity dates, fees, and other provisions of the prospective borrower's desired loan;

guiding the prospective borrower through a listing of logistical preferences related to the timing of term sheets, timing of loan funding, and the preferred attributes, such as geographic location, lender size, trends of certain loan terms, and other factors that may be of importance to that borrower for a lending partner;

allowing the prospective borrower to select certain or all lenders identified, though unnamed, as likely viable lenders for that specific borrower and the borrower's requested deal based on matching algorithms based on data previously inputted by borrower, data previously inputted by the lenders, and behavior of the lenders in prior bidding deals;

including a ranking system such that the unnamed lenders will appear with certain rankings or indicators such that the prospective borrower could determine whether the lenders were stronger matches for their requested deal than others;

upon receiving at least one matching lender, the prospective borrower may be led through a template containing a series of questions, the responses of which could be typed text, which would automatically populate a formally formatted loan proposal for the prospective lenders to review;

providing access to a secure data chat room where the certain anonymous, yet borrower selected, lenders could be invited to join the data chat room via a system generated email;

if the lender agrees to accept the offer invitation from the email, then the lender may be directed to the website via internal link where the lender can enter the data chat room, at which point the lender's identity will be revealed to the borrower and the borrower's name will be revealed to the lender;

lenders in the data room are then be able to download deal documents, setup conference calls, ask questions, and provide term sheets via pdf or digitally; and including dependencies and sequencing of tasks.

A terms sheet system capable of:

guiding the prospective lender through a process to input the specific loan terms that they would like to send to a borrower in response to a loan request, including term, amortization, financial covenants, non-financial covenants, maturity dates, fees, and other provisions of the prospective borrower's desired loan;

incorporating artificial intelligent analysis and decision making to provide real time indications of competitiveness or predicted borrower receptivity based on both each term and on the collectively inputted terms prior to submitting the proposed terms to the borrower;

incorporating artificial intelligent analysis and decision making to provide instantaneous suggested competitive terms with a high, medium, and low probability of being selected based on system generated view of both competition, the lender's brand perception, and the borrower's selection criteria;

allowing for the lender to input custom legal wording, logos, and other attachments that lender may want to include with their submission; and indicating to the lender the time limit as determined by the borrower.

A lender risk criteria input system capable of:

guiding the lender through a process to input loan facility preferences and ranges for loan characteristics such as term, amortization, financial covenants, non-financial covenants, maturity, fees, leverage limits and other provisions;

guiding the lender through a process to input borrower parameters and ranges for revenues, EBITDA, profitability, growth trends, assets, non-financial information, and other financial and non-financial characteristics related to industry, operations, historical financial information, geographic location, and prospective financial information;

allowing the creation of or request of new yet to be programmed or incorporated financial and loan metrics to be added to the filter of the lender profile and the borrower data intake processes;

including dependencies and sequencing of tasks; and utilizing machine learning such that future additional loan facilities can be entered in more quickly and with fewer errors.

A debt capacity visualizer system capable of:

incorporating financial metrics and existing debt metrics of the current borrower;

incorporating data from corresponding lender responses from similar companies and or similar deals, where similar borrowers of similar deals will be identified by algorithms;

incorporating lender profiles and target deals specifics, such as target leverage;

determining by artificial intelligence the maximum leverage tolerances for both asset based loans and cash flow loans based on similar companies by averaging the relevant data;

interfacing with other systems contained within the platform; and including dependencies and sequencing of tasks.

A terms tracker visualization system capable of:

incorporating financial metrics and existing debt metrics of the current borrower;

incorporating data from the received corresponding lender responses from similar companies and or similar deals, where similar borrowers of similar deals will be identified by algorithms;

incorporating lender profiles and target deals specifics, such as target leverage;

determining by algorithm the extreme range tolerances of specific terms, such as amortization, pricing, collateral, covenants, guaranty requirements, and other loan characteristics, for borrowers of similar profile, which is determined by algorithm and accounts for industry, revenue size, profitability, growth, assets, liabilities, and other financial and operational characteristics;

determining by algorithm the range tolerances of specific terms, such as amortization, pricing, collateral, covenants, guaranty requirements, and other loan characteristics, for similarly structured loans placed within three years for similar borrowers, which is determined by algorithm and accounts for industry, revenue size, profitability, growth, assets, liabilities, and other financial and operational characteristics; and interfacing with other modules and systems contained within the platform.

CONCLUSION

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

We claim:

1. An autonomous marketplace system to facilitate financing from a lender to a borrower, comprising:

a server computing device configured to:

extract borrower data comprising financial, industry operational and business data;

extract lender data from one or more prospective lenders comprising financial data and a target profile for each prospective lender, the target profile including one or more of revenue ranges, cash flow ranges, balance sheet metrics, and operational metrics;

generate, using artificial intelligence, an autonomous ranked match of prospective lenders able to provide favorable terms for the borrower's requested use of proceeds of the financing, based on a prediction of specific terms for aspects of the financing including one or more of price, fees, structure, and amount, wherein the artificial intelligence is used to identify one or more relationships between the borrower data, the one or more prospective lender data, and historical and projected economic data to generate the autonomous ranked match based on a preference of the borrower and a correlation between the identified relationships, wherein the historical and projected economic data includes market performance and federal regulation, and wherein the artificial intelligence for identifying and ranking relationships is trained using training data collected from comparable borrowers, prospective lenders, and the historical and projected economic data, and evolves through machine learning; and create and host an internet based data chat room, wherein the borrower enters the internet based data chat room and upon entering, the identities of the one or more prospective lenders are revealed, wherein the borrower, within the internet based data chat room, reviews a ranked list of prospective lenders and selects one or more prospective lenders to receive a finance request, and wherein after selection by the borrower, the selected prospective lenders are first notified and informed of an existence of the finance request of the borrower.

2. The autonomous marketplace system of claim 1, wherein the server computing device is further configured to generate a spectrum of predictive terms of credit facilities for the borrower, identification of one or more factors of a credit facility that negatively or positively impacts an ability to locate relevant lenders, and dynamic and real time indications of competitiveness of a specific term proposed by a prospective lender.

3. The autonomous marketplace system of claim 1, further comprising a secure database configured to store data, wherein the data is collected from a web platform that allows the borrower and the prospective lenders to input information.

4. The autonomous marketplace system of claim 1, wherein the artificial intelligence is configured to analyze data to group similar borrowers and similar credit facilities and identify historical patterns and trends and predict future trends and patterns.

5. The autonomous marketplace system of claim 1, wherein the lender data include a risk parameter, a proposed credit facility, market data, Federal Reserve economic data, proposed lender bids on loan requests, failed lender bids, successful lender bids, or bid response times.

6. The autonomous marketplace system of claim 1, wherein the internet based data chat room is further configured to allow the borrower to provide data, reports and financials.

7. The autonomous marketplace system of claim 1, wherein the internet based data chat room is further configured to allow the borrower to control a prospective lender's access to the internet based data chat room and to track a prospective lender's actions within the internet based data chat room.

8. A non-transitory computer-readable medium having instructions stored thereon that, when executed by a processor, cause the processor to dynamically extract and autonomously match one or more prospective lenders and a borrower, the extracting and autonomously matching comprising:

extracting borrower data comprising financial, industry operational and business data;

extracting lender data from one or more prospective lenders comprising financial data and a borrower target profile for each prospective lender, the target profile including one or more of revenue ranges, cash flow ranges, balance sheet metrics, and operational metrics;

generating, using artificial intelligence, an autonomous ranked match of prospective lenders able to provide favorable terms for the borrower's requested use of proceeds of the financing, based on a prediction of specific terms for aspects of the financing including one or more of price, fees, structure, and amount, wherein the artificial intelligence is used to identify one or more relationships between the borrower data, the one or more prospective lender data, and historical and projected economic data to generate the autonomous ranked match based on a preference of the borrower and a correlation between the identified relationships, wherein the historical and projected economic data includes market performance and federal regulation, and wherein the artificial intelligence for identifying and ranking relationships is trained using training data collected from comparable borrowers, prospective lenders, and the historical and projected economic data, and evolves through machine learning;

creating an internet based data chat room;

entering, by the borrower, the internet based data chat room and upon entering a ranked list of prospective lenders is revealed; and selecting, by the borrower, within the internet based data chat room one or more prospective lenders to receive a finance request, wherein after selection by the borrower, the selected prospective lenders are first notified and informed of an existence of the finance request of the borrower.

9. The non-transitory computer-readable medium of claim 8, further comprising:

generating a spectrum of predictive terms of credit facilities for the borrower;

identifying one or more factors of a credit facility that negatively or positively impacts an ability to locate relevant lenders; and generate dynamically, in real time, indications of competitiveness of a specific term proposed by a prospective lender.

10. The non-transitory computer-readable medium of claim 8, further comprising storing data in a secure database, wherein the data is collected from a web platform that allows the borrower and the prospective lenders to input information.

11. The non-transitory computer-readable medium of claim 8, wherein the artificial intelligence analyzes data to group similar borrowers and similar credit facilities and identify historical patterns and trends and predict future trends and patterns.

12. The non-transitory computer-readable medium of claim 8, wherein the lender data include a risk parameter, a proposed credit facility, market data, Federal Reserve economic data, proposed lender bids on loan requests, failed lender bids, successful lender bids, or bid response times.

13. The non-transitory computer-readable medium of claim 8, wherein the internet based data chat room allows the borrower to provide data, reports and financials.

14. The non-transitory computer-readable medium of claim 8, wherein the internet based data chat room allows the borrower to control a prospective lender's access to the internet based data chat room and to track a prospective lender's actions within the internet based data chat room.

15. A computer implemented method utilizing computer based artificial intelligence for the extracting and autonomous matching of one or more prospective lenders and a borrower, the method comprising:

extracting borrower data comprising financial, industry operational and business data;

extracting lender data from one or more prospective lenders comprising financial data and a target profile for each prospective lender, the target profile including one or more of revenue ranges, cash flow ranges, balance sheet metrics, and operational metrics;

generating, using artificial intelligence, an autonomous ranked match of prospective lenders able to provide favorable terms for the borrower's requested use of proceeds of the financing, based on a prediction of specific terms for aspects of the financing including one or more of price, fees, structure, and amount, wherein the artificial intelligence is used to identify one or more relationships between the borrower data, the one or more prospective lender data, and historical and projected economic data to generate the autonomous ranked match based on a preference of the borrower and a correlation between the identified relationships, wherein the historical and projected economic data includes market performance and federal regulation, and wherein the artificial intelligence for identifying and ranking relationships is trained using training data collected from comparable borrowers, prospective lenders, and the historical and projected economic data, and evolves through machine learning;

creating an internet based data chat room;

entering, by the borrower, the internet based data chat room and upon entering a ranked list of prospective lenders is revealed; and selecting, by the borrower, within the internet based data chat room one or more prospective lenders to receive a finance request, wherein after selection by the borrower the selected prospective lenders are first notified and informed of an existence of the finance request of the borrower.

16. The computer implemented method of claim 15, further comprising storing data in a secure database, wherein the data is collected from a web platform that allows the borrower and the prospective lenders to input information.

17. The computer implemented method of claim 15, wherein the artificial intelligence analyzes data to group similar borrowers and similar credit facilities and identify historical patterns and trends and predict future trends and patterns.

18. The computer implemented method of claim 15, wherein the lender data include a risk parameter, a proposed credit facility, market data, federal reserve economic data, proposed lender bids on loan requests, failed lender bids, successful lender bids, or bid response times.

19. The computer implemented method of claim 15, wherein the internet based data chat room allows the borrower to provide data, reports and financials.

20. The computer implemented method of claim 15, wherein the internet based data chat room allows the borrower to control a prospective lender's access to the internet based data chat room and to track a prospective lender's actions within the internet based data chat room.

* * * * *